United States Patent
Krishnaraj et al.

(10) Patent No.: US 8,990,812 B2
(45) Date of Patent: Mar. 24, 2015

(54) TASK DECOMPOSITION WITH THROTTLED MESSAGE PROCESSING IN A HETEROGENEOUS ENVIRONMENT

(75) Inventors: Sidambara Raja Krishnaraj, Chennai (IN); Jude Yuvaraj, Chennai (IN)

(73) Assignee: Infosys Limited, Bangalore (IN)

( * ) Notice: Subject to any disclaimer, the term of this patent is extended or adjusted under 35 U.S.C. 154(b) by 1709 days.

(21) Appl. No.: 12/193,640

(22) Filed: Aug. 18, 2008

(65) Prior Publication Data
US 2010/0005472 A1    Jan. 7, 2010

(30) Foreign Application Priority Data
Jul. 7, 2008   (IN) .......................... 1643/CHE/2008

(51) Int. Cl.
*G06F 9/46*    (2006.01)
*G06F 9/50*    (2006.01)

(52) U.S. Cl.
CPC ............ *G06F 9/5044* (2013.01); *G06F 9/5005* (2013.01); *G06F 9/5038* (2013.01); *G06F 2209/5017* (2013.01)
USPC .......................................................... 718/100

(58) Field of Classification Search
None
See application file for complete search history.

(56) References Cited

U.S. PATENT DOCUMENTS

| | | | | |
|---|---|---|---|---|
| 6,112,225 A * | 8/2000 | Kraft et al. | ............... | 709/202 |
| 7,620,945 B1 * | 11/2009 | Song et al. | ............... | 717/149 |
| 2003/0177161 A1 * | 9/2003 | Rothschild | ............... | 709/100 |
| 2005/0125793 A1 * | 6/2005 | Aguilar et al. | ............... | 718/100 |
| 2006/0136918 A1 * | 6/2006 | Lewis et al. | ............... | 718/100 |
| 2008/0244599 A1 * | 10/2008 | Hodson et al. | ............... | 718/104 |
| 2008/0244610 A1 * | 10/2008 | Zhang et al. | ............... | 718/104 |
| 2009/0089537 A1 * | 4/2009 | Vick et al. | ............... | 711/203 |

OTHER PUBLICATIONS

Blake M.B., "Coordinating Multiple Agents for Workflow-Oriented Process Orchestration," Information Systems and E-Business Management Journal, 2003, pp. 1-18, 18 pages.
Mallalieu et al., "Enterprise Interoperability: .NET and J2EE," Microsoft Corporation MSDN website, Jan. 2004, 23 pages.
Subraya et al., "Object Driven Performance Testing of Web Applications," Proceedings of the First Asia-Pacific Conference on Quality Software (APAQS'00), 2000, 10 pages.
"Description of technologies implemented in one or more software applications sent to one or more Infosys U.S. customers on or before Apr. 1, 2006," 10 pages.
Sourceforge.net, Question from Sidambara Raja Krishnaraj, Nov. 10, 2003, 4 pages.

* cited by examiner

*Primary Examiner* — Jacob A Petranek
(74) *Attorney, Agent, or Firm* — Klarquist Sparkman, LLP

(57) ABSTRACT

Tasks for a business process can be decomposed into subtasks represented by messages. Message processing can be throttled in a heterogeneous environment. For example, message processing at subtask nodes can be individually throttled at the node level by controlling the number of instances of subtask processors for the subtask node. An infrastructure built with framework components can be used for a variety of business process tasks, separating business logic from the framework logic. Thus, intelligent scalability across platform types can be provided for large scale business processes with reduced development time and resources.

20 Claims, 17 Drawing Sheets

TASK DECOMPOSITION WITH THROTTLED MESSAGE PROCESSING IN A HETEROGENEOUS ENVIRONMENT

CROSS-REFERENCE TO RELATED APPLICATION

This application claims the benefit of Indian patent application 1643/CHE/2008, filed Jul. 7, 2008, which is hereby incorporated herein by reference.

BACKGROUND

Enterprise applications must often process time-consuming and long-running tasks in a background environment. When faced with the challenge of developing software for the enterprise application, programmers are faced with daunting infrastructure challenges in addition to the business logic related to the tasks. Assembling the architecture for such an infrastructure is costly and limits productivity and efficiency.

A task may take a long time to execute and may require multiple system resources. Although workflow orchestration tools can be used to implement long-running tasks, such tools lack task-level scalability. Accordingly, products that increase overall scalability also increase cost and reduce flexibility.

Therefore, there still remains need for techniques to address scalability when executing large scale tasks without significantly increasing costs or reducing flexibility.

SUMMARY

A variety of techniques can be used for achieving scalability when executing large scale tasks. For example, tasks can be decomposed into one or more messages representing subtasks for the task in a decomposition technique.

A messaging system can serve as a backbone of a framework into which business process-specific components are integrated. Messages can be processed by the business process-specific components. However, framework components can provide an infrastructure independent of the business logic of the tasks. Messages can be routed to subtask nodes at which they are processed.

Load distribution can be configured at the subtask node level. For example, one or more instances of subtask processors dedicated to accomplishing certain respective subtasks can be instantiated at the subtask nodes. A subtask processor manager can control the number of instances of subtask processors. For example, the maximum number of simultaneously instantiated instances can be limited to a particular number. Thus, each subtask node can be separately throttled, allowing the system to be tuned as desired with respect to resource utilization at the node level.

Because the business logic can be decoupled from the framework, developers can focus on the particularities of the business process and reap the benefits of intelligent scalability and load balancing in their system without having to address coding for these issues during development.

Heterogeneous environments can be supported. For example, a system can be intranodally heterogeneous, internodally heterogeneous, or both. So, subtasks can execute in different execution environments as appropriate to optimize resources.

As described herein, a variety of other features and advantages can be incorporated into the technologies as desired.

The foregoing and other features and advantages will become more apparent from the following detailed description of disclosed embodiments, which proceeds with reference to the accompanying drawings.

DETAILED DESCRIPTION

Example 1

Exemplary System Employing a Combination of the Technologies

Figure 1:
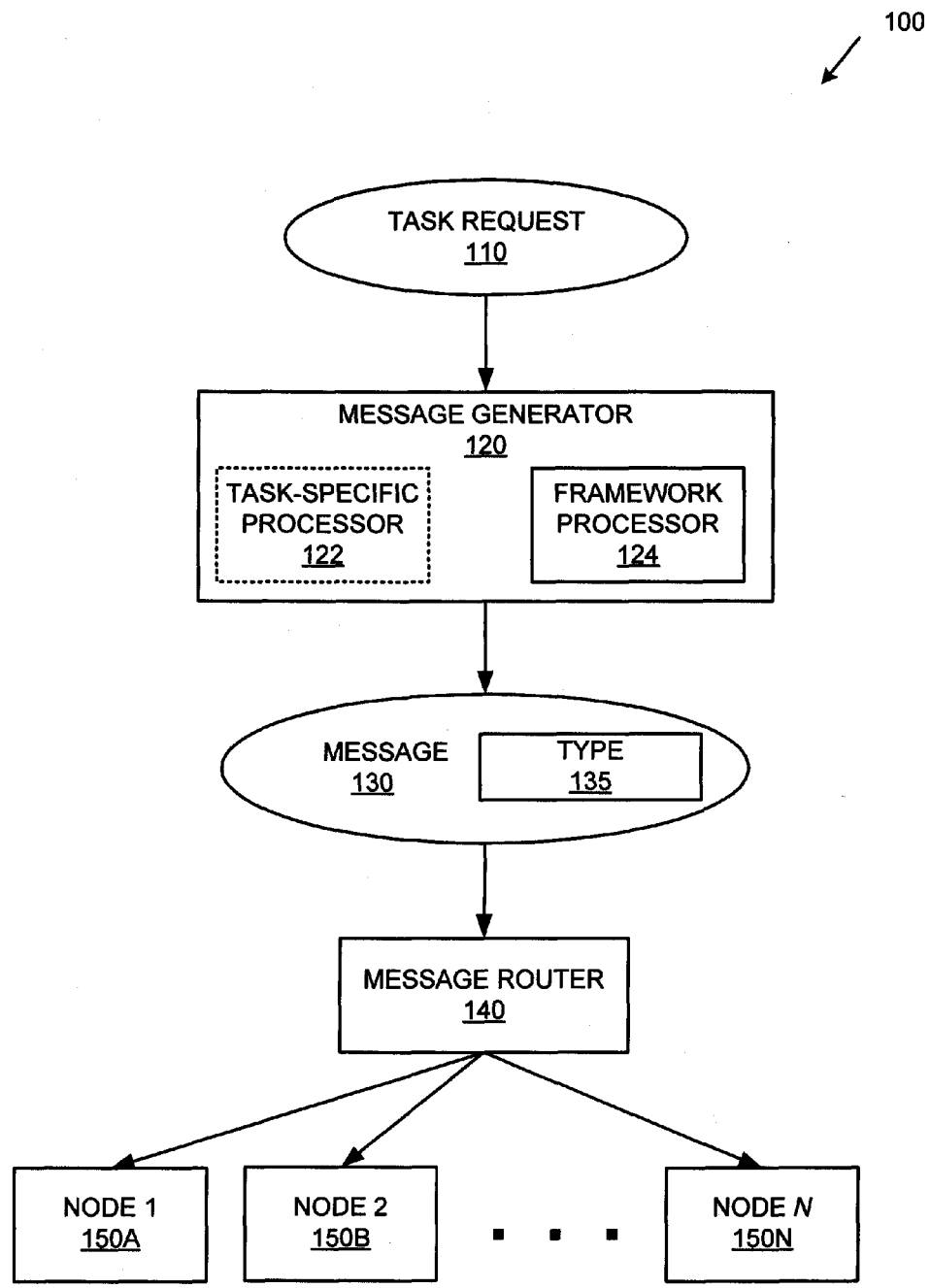
FIG. 1 is a block diagram of an exemplary system implementing throttling of decomposed subtasks.

FIG. 1 is a block diagram of an exemplary system 100 implementing task decomposition with throttled message processing. The system 100 and variants of it can be used to perform any of the methods described herein.

In the example, a message generator 120 can receive a task request 110 and generate one or more messages 130, which a message router 140 routes to a plurality of nodes 150A-N. The messages 130 can include respective types 135.

The message generator 120 can include one or more task-specific processors 122 and one or more framework processors 124.

In practice, the system 100 can be more complicated, with additional devices, networks, services, databases, and the like.

Example 2

Exemplary Task Request

In any of the examples herein, a task request can take a variety of forms. For example, a task request can be sent from another program or by a user to indicate the task request and can include information for accomplishing the task, such as the task type, input information for the task, and the like.

Task requests can be generated via user interfaces such as application interfaces (e.g., a graphical user interface, command line, and the like), web portals, schedulers, monitors (e.g., watching for particular events, the presence of files, and the like), and the like.

Task requests can also take the form of events (e.g., periodically, end of the day, or some other schedule or condition).

The task can be any business process task related to processing for accomplishing business objectives. Such tasks typically include business logic, such as business process-specific logic. Business process tasks can include any processing related to business data (e.g., documents, orders, forms, database records, emails, statements, and the like). As described herein, business process tasks can be decomposed into one or more discrete subtasks.

Example 3

Exemplary Message Generator

In any of the examples herein, a message generator can take a variety of forms. As described herein, the message generator can decompose the task for the task request into one or more subtasks, which can be represented by messages for routing to respective nodes for processing to accomplish the task.

Example 4

Exemplary Framework Components

A framework for a message generator can be provided in the form of one or more framework processors (e.g., spoolers, queues, managers, routers, and the like) that can operate independent of the business logic involved with the business process tasks. Such framework components can be generic to the business processes implemented in the system. For example, the framework components can be designed and developed so that they do not implement any business logic.

In some cases, such framework processors can be configured (e.g., customized) for the business process tasks, but can do so without re-coding the framework processors. For example, a configuration file or database can specify parameters and metadata regarding the business process tasks to customize the behavior of the framework components.

Example 5

Exemplary Messages

In any of the examples herein, a message can be implemented in a variety of ways. For example, any product supporting messaging, such as MICROSOFT Message Queuing (MSMQ), IBM's MQ-Series, and the like, can be used as a messaging infrastructure for the technologies described herein.

Message functionality provided by such products includes sending, receiving, queuing, and listening for messages.

A message can have (e.g., include) one out of a plurality of message types. As described herein, the message type of a message can be used to designate the type of processing associated with the subtask. The message type can be used to indicate to which subtask node the message is to be directed.

In practice, a message can include any information for accomplishing subtask processing. For example, data or references to data (e.g., file names, database references, or the like) can be included. For example, such information can be stored as Extensible Markup Language (XML) in the message.

Example 6

Exemplary Queues

In any of the examples herein, messages can be stored on queues as they wait for processing. For example, messages representing decomposed tasks can initially be placed on an outbound queue and then directed to another queue as processed by system components after business process-specific processing. A message router can then send the messages to subtask nodes, where they can wait on respective queues until processed.

Example 7

Exemplary Message Router

In any of the examples herein, messages can be sent to appropriate nodes based on a message router that can be implemented as a framework component. For example, configuration data can be consulted by the router to determine the identity and location of nodes. A simple technique is to map messages to a subtask node based on message type. More complex logic can be implemented if desired.

Example 8

Exemplary Decomposition

In any of the examples herein, a task can equate to a business process that comprises a plurality of subtasks (e.g., processes). Decomposition can be done using parallel techniques, sequential techniques, or both. For example, upon receipt of a task request, the task can be broken down into separate subtasks as messages to be processed in parallel. Or, the task can be broken down into a first subtask as a message that is to be processed, with other subtasks following after the first subtask is completed. A combination of both techniques can be used. For example, a sequential technique can also employ parallel processing, and a parallel technique can employ sequential processing.

Tasks can be initially decomposed into one or more subtasks by a business process-specific component such as a business process decomposer. A framework component can manage the various subtasks in concert with one or more business process-specific component such as a business process handlers.

Example 9

Exemplary Method of Processing a Task Request

Figure 2:
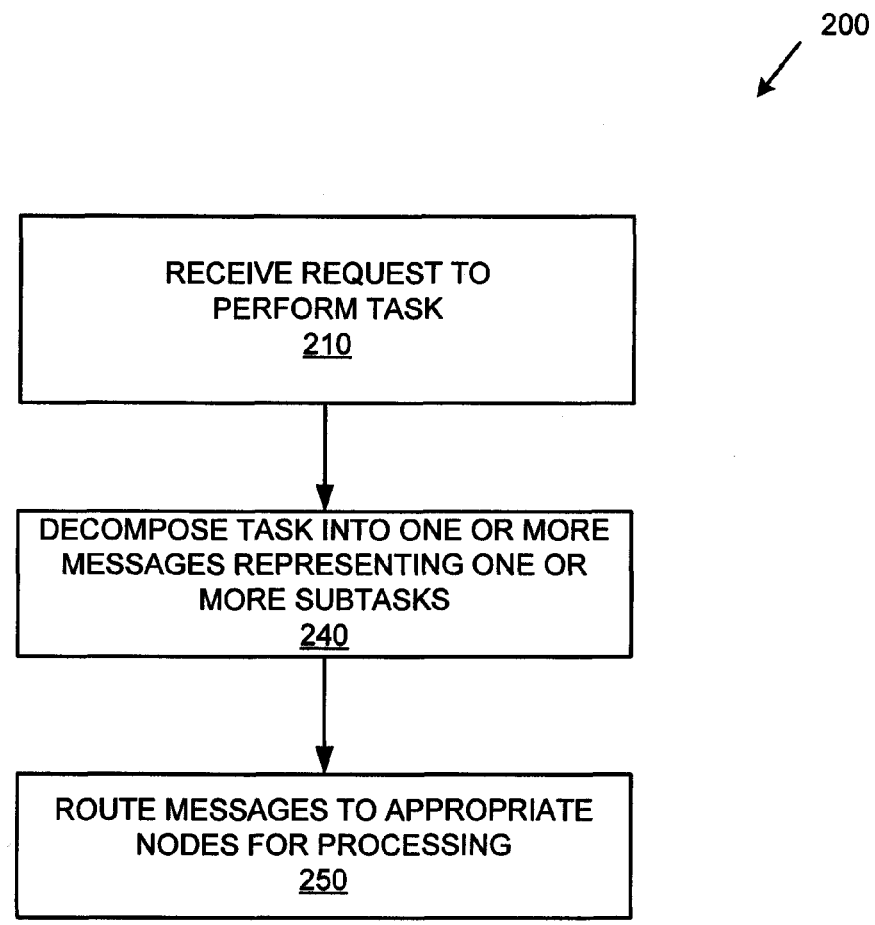
FIG. 2 is a flowchart of an exemplary method of processing a task request implementing decomposition and routing to nodes.

FIG. 2 is a flowchart of an exemplary method 200 of processing a task request implementing decomposition and routing to subtask nodes and can be used in any of the examples herein.

At 210, a request to perform a task is received.

At 240, the task is decomposed into one or more messages representing one or more respective discrete subtasks. The subtasks can be associated with respective subtask types.

At 250, the messages are routed to appropriate subtask nodes for processing. Routing can be based at least on a type (e.g., subtask type, message type, or the like) for the message.

As described herein, the subtask nodes can be separately throttled to tune performance.

Example 10

Exemplary System Supporting Throttling

Figure 3:
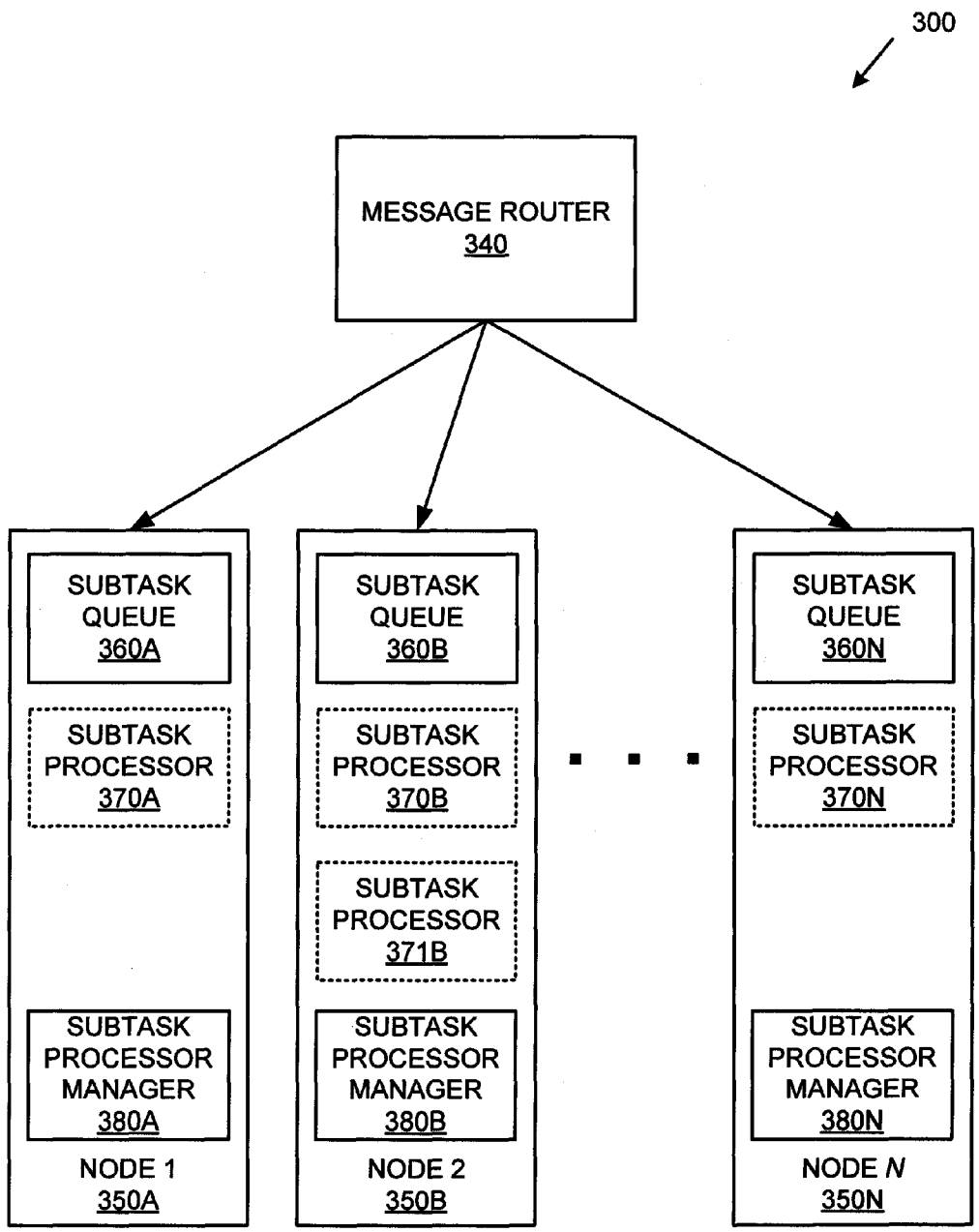
FIG. 3 is a block diagram of an exemplary system supporting separately throttleable nodes.

FIG. 3 is a block diagram of an exemplary system 300 supporting separately throttleable subtask nodes and can be used in any of the examples herein.

In the example, a message router 340 sends subtasks represented as messages to a plurality of nodes 350A-N.

In any of the examples herein, a plurality of subtask nodes 350A-N can be configured to process respective types of subtasks. For example, a particular subtask node can be dedicated to processing a respective particular type of subtask (e.g., which can be represented by a subtask type value).

A subtask node 350A can include a business process-specific subtask processor 370A, which includes logic for performing processing for a particular subtask type. As shown, more than one instance 370B and 371B can be instantiated per subtask type.

A subtask processor manager 380A can manage the number of instances. For example, an administrator can indicate the maximum number of instances permitted per subtask node. For example, the maximum number of simultaneous (e.g., in existence at the same time, parallel, concurrent, or the like) instances can be limited to the maximum number indicated.

In practice, a node 350B can be implemented via a queue 360B (e.g., a single instance), with the one or more instances of the subtask processors 370B and 371B listening on the queue 360B. When a subtask processor completes processing for a subtask, it can consume messages sitting on the queue 360B.

More than one subtask node can be implemented on a single computer. Similarly, a node can span more than one computer. For example, one or more computers can listen on a queue located on another computer. In this way, scalability can be applied to the subtask nodes to apply additional resources and avoid processing bottlenecks.

Example 11

Exemplary Method of Throttling

Figure 4:
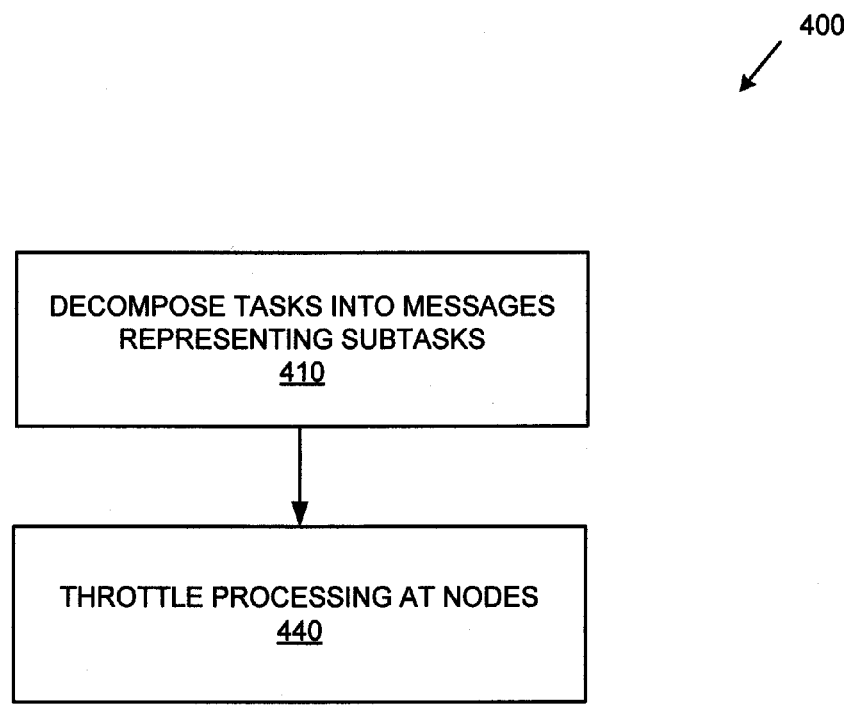
FIG. 4 is a flowchart of an exemplary method of decomposing tasks and throttling at nodes.

FIG. 4 is a flowchart of an exemplary method 400 of decomposing tasks and throttling at nodes and can be used in any of the examples herein. Throttling can achieve load balancing by distributing available resources according to subtask type. As described herein, throttling can be done at the subtask node level to tune the system with respect to resource utilization.

At 410, tasks are decomposed into one or more messages representing one or more respective subtasks of the task. At 440, processing of the subtasks is throttled at subtask nodes. For example, throttling at least one of the subtask nodes can be independent of the other nodes. Throttling can control resources applied by the subtask node for processing subtasks of the subtask type associated with the subtask node.

Throttling can be achieved by creating a particular number of instances of subtask processors (e.g., at respective subtask nodes). For example, a particular number of instances of subtask processors created at one subtask node can be different from a number of instances of a different subtask processor at another subtask node.

Creation of instances can be limited to one number at one node and a different number at another node.

As described herein, a subtask processor manager can manage creation of subtask processor instances. Instances can be created upon initiation of the node or dynamically during processing.

Example 12

Exemplary Subtask Processors

In any of the examples herein, a subtask process can take the form of any component for processing related to accomplishing a subtask related to a business process task. For example, subtask processors can implement logic related to the activities, jobs, or other processing for the subtask. Because the system can separately accommodate subtask processors, one task processor can execute independently of the others. New subtask processors can be developed for incorporation into the system as long as they follow framework conventions (e.g., consuming messages from the appropriate queues and so forth).

Example 13

Exemplary Subtask Node Configuration Table

Any number of techniques can be used to configure throttling as described herein. For example, configuration values can be stored on one or more tangible computer-readable media comprising a subtask node configuration table.

Such a table can comprise a plurality of entries. Any entry can comprise a subtask type indicative of a type of subtask of a business process task, a subtask node name indicative of a queue to which subtasks of the subtask type are to be directed, and an instantiation limit indicative of a maximum number of instances of subtask processors to be instantiated (e.g., simultaneously) in the subtask node for processing subtasks of the subtask type.

The table can be edited to control load distribution among the subtask nodes. It can be stored as XML, a database, text, or the like. Editing the data with an appropriate editor can be done to accomplish configuration by an administrator.

Example 14

Exemplary Supporting Technologies for Implementation

Any of the examples herein can be implemented via a variety of development and deployment platform types such as the MICROSOFT NET or JAVA Platform, Enterprise Edition (e.g., J2EE or others) technologies.

The technologies herein can be implemented in a heterogenous environment. For example, one subtask node can be implemented on one platform type (e.g., .NET) and another can be implemented on another platform type (e.g., JAVA Platform, Enterprise Edition). Thus, the subtask nodes can execute on a mixture of different operating platforms. Subtasks of one subtask type can be executed in an execution environment of one type, and subtasks of another subtask type can be executed in an execution environment of a different type. Any platform capable of receiving messages of the form used by the message router can receive a message and process a subtask.

So, for example, certain subtask types may be best suited for performance on a platform supporting specialized resources, a mainframe, or the like. If so, a subtask processor for such a platform can be implemented to accommodate processing.

Different operating platform types can have different operating system types, different execution environment types, different hardware types, different messaging backbone types, different processor types, and the like. Any supported hardware platform can be used. For example, any hardware platform supported by the NET framework or JAVA Platform, Enterprise Edition application servers can be used. JAVA Platform, Enterprise Edition can run on UNIX-based or MICROSOFT WINDOWS-based operating systems.

Messaging backbones include MICROSOFT Message Queuing (MSMQ), IBM's MQ-Series, and the like.

Example 15

Exemplary Method of Coordinating Subtask Processing: Parallel

Figure 5:
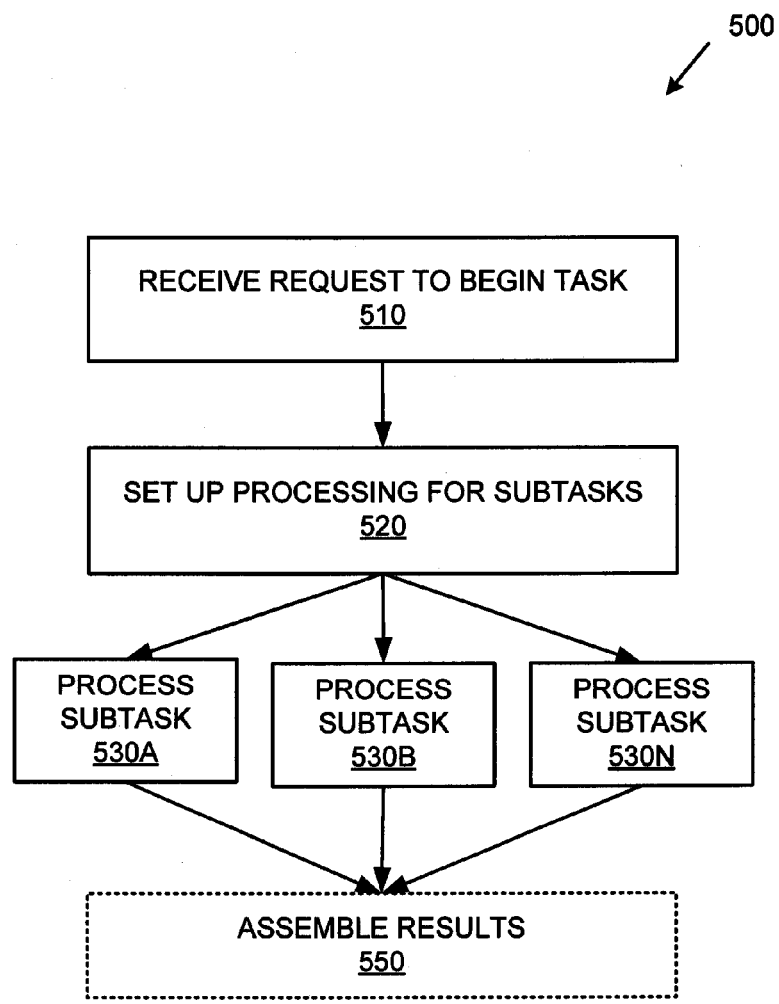
FIG. 5 is a flowchart of an exemplary method of coordinating subtask processing for a task in a parallel scenario.

FIG. 5 is a flowchart of an exemplary method 500 of coordinating subtask processing for a task in a parallel scenario and can be used in any of the examples herein.

At 510, a request to begin the task is received.

At 520, processing is set up for one or more subtasks represented as one or more respective messages.

At 530A-N, the individual subtasks are processed at task nodes.

At 550, results can be assembled to complete the task. In some cases, assembly can be achieved cooperatively by the individual subtask 530A-N, so that a separate assembly step is omitted.

Example 16

Exemplary Method of Coordinating Subtask Processing: Sequential

Figure 6:
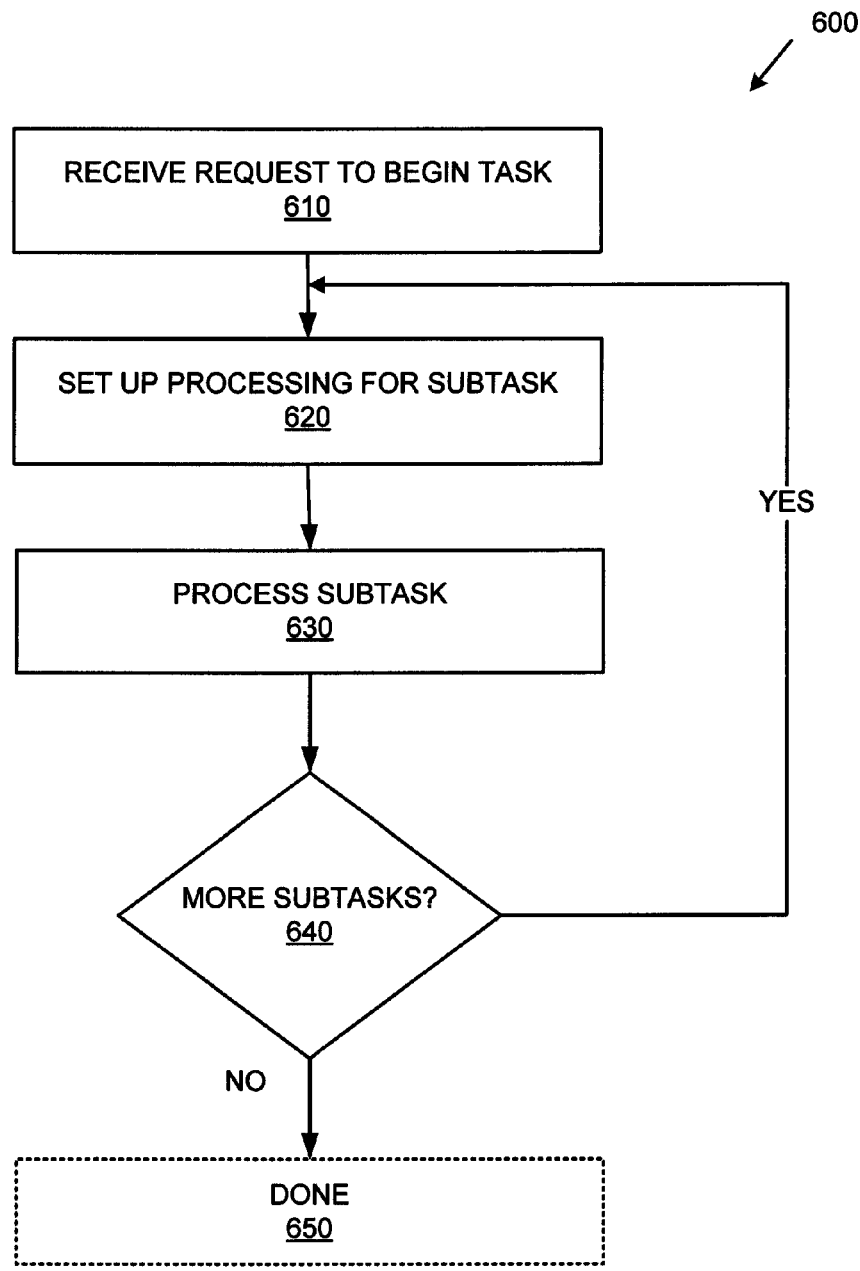
FIG. 6 is a flowchart of an exemplary method of coordinating subtask processing for a task in a sequential scenario.

FIG. 6 is a flowchart of an exemplary method 600 of coordinating subtask processing for a task in a sequential scenario and can be used in any of the examples herein. Sequential processing can be used in addition to or instead of parallel processing.

At 610, a request to begin the task is received. At 620, processing is set up for a subtask represented as a message.

At 630, the subtask is processed at a task node.

At 640, it is determined whether there are additional subtasks to be performed. If so, processing continues at 620.

Otherwise, the task is done at 650. If desired, clean up or other work can be done upon completion of the task (e.g., to note that the task is completed).

Example 17

Exemplary Coordinating Subtask Processing: Division of Labor

When coordinating subtask processing, task reception can be accomplished by a framework component. A framework component can also aid in managing the messaging process (e.g., message construction), track task completion, and the like.

However, decomposing subtasks, determining what information is placed into the messages representing the subtasks, and coordinating sequential or parallel processing can be accomplished by business process-specific components. Subtasks can be implemented as parts of workflows, data processing tasks, and the like. Dependencies and sequencing of the subtasks can be addressed as appropriate for the business process.

Example 18

Exemplary System Constructed via Framework

Figure 7:
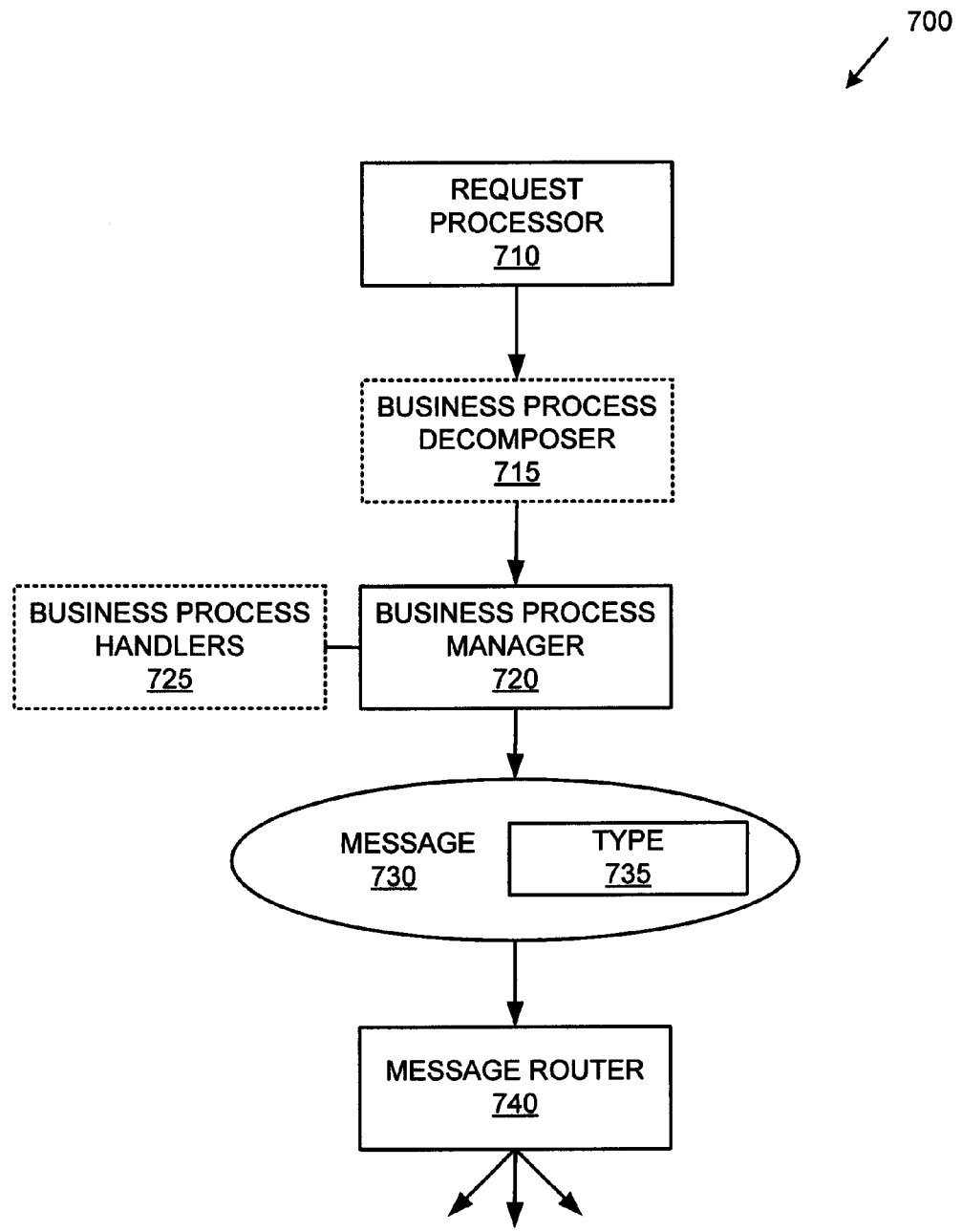
FIG. 7 is a block diagram of an exemplary system constructed by plugging business process logic into a framework.

FIG. 7 is a block diagram of an exemplary system 700 constructed by plugging business process logic into a framework. The example includes framework components such as a request processor 710, a business process manager 720, and a message router 740.

The system can also include business process-specific components such as the business process decomposer 715 and the business processes handlers 725, which are specific to the business processes associated with the system 700 and include business process-specific logic.

The message 730 can include a type 735. The message 730 can include business process-specific information (e.g., placed there by the business process-specific components).

As shown in FIG. 3, the subtask nodes can also include framework components.

Because much of the system is provided as framework components, development can proceed more efficiently and quickly by building on the architecture implemented by the framework components. Thus, developers can focus on the business logic and not be concerned with details concerning message handling, throttling, and the like.

The business process decomposer 715 can decompose the business process task into one or more messages representing one or more subtasks of the task.

The business process manager framework component 720 can consult a business process handler 725 (e.g., based on the type of message, which can indicate the type of subtask) to orchestrate processing of the subtask. Thus, the business process manager 720 framework component can, in concert with a business process handler 725, orchestrate processing of the subtask.

Processing can comprise generating a directed message (e.g., 730) for the subtask. The directed message can comprise a type indicative of a subtask node (e.g., type of node) to which the directed message is to be directed.

The message router 740 can route the directed message to the subtask node to which the directed message is to be directed.

At the subtask node, the message can be received at a subtask queue. The message can then be retrieved for processing by an instance of a subtask processor of the subtask node. Processing can be throttled at a node level. For example, retrieving from the queue can be limited by a limit set on a number of instances of the subtask processor to be created within the subtask node by a per-subtask node configurable setting.

Example 19

Exemplary Method of Constructing a System Constructed Via Framework

Figure 8:
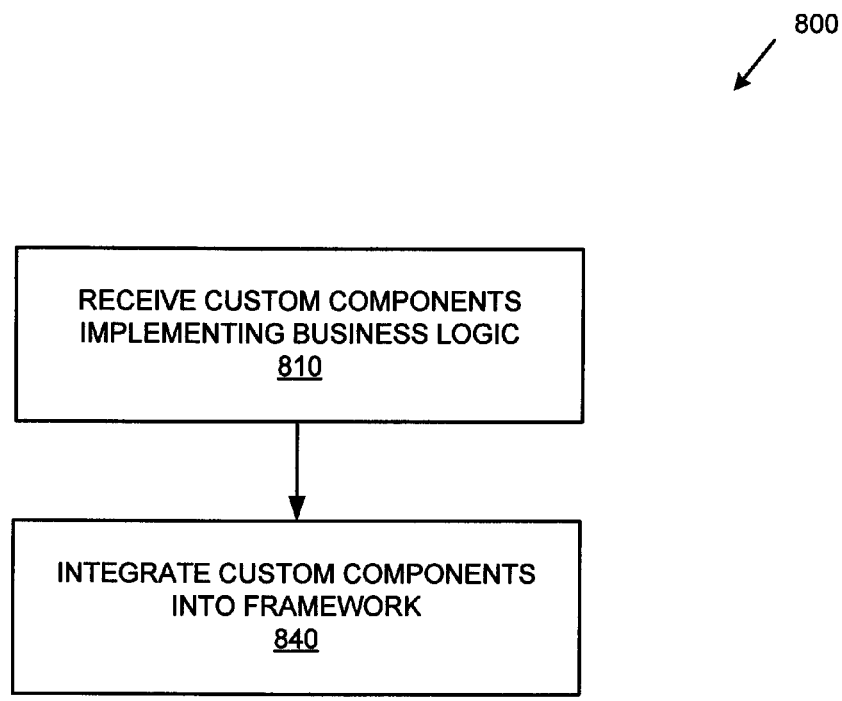
FIG. 8 is a flowchart of an exemplary method of constructing a system via a framework.

FIG. 8 is a flowchart of an exemplary method 800 of constructing a system via a framework. At 810, custom components (e.g., business process-specific components) implementing the business logic specific to the tasks and subtasks of the business process are received.

At 840, the custom components are integrated into a framework. For example, the custom components can be installed. Additionally, configuration information can be set for the framework components.

Example 20

Exemplary System

Figure 9:
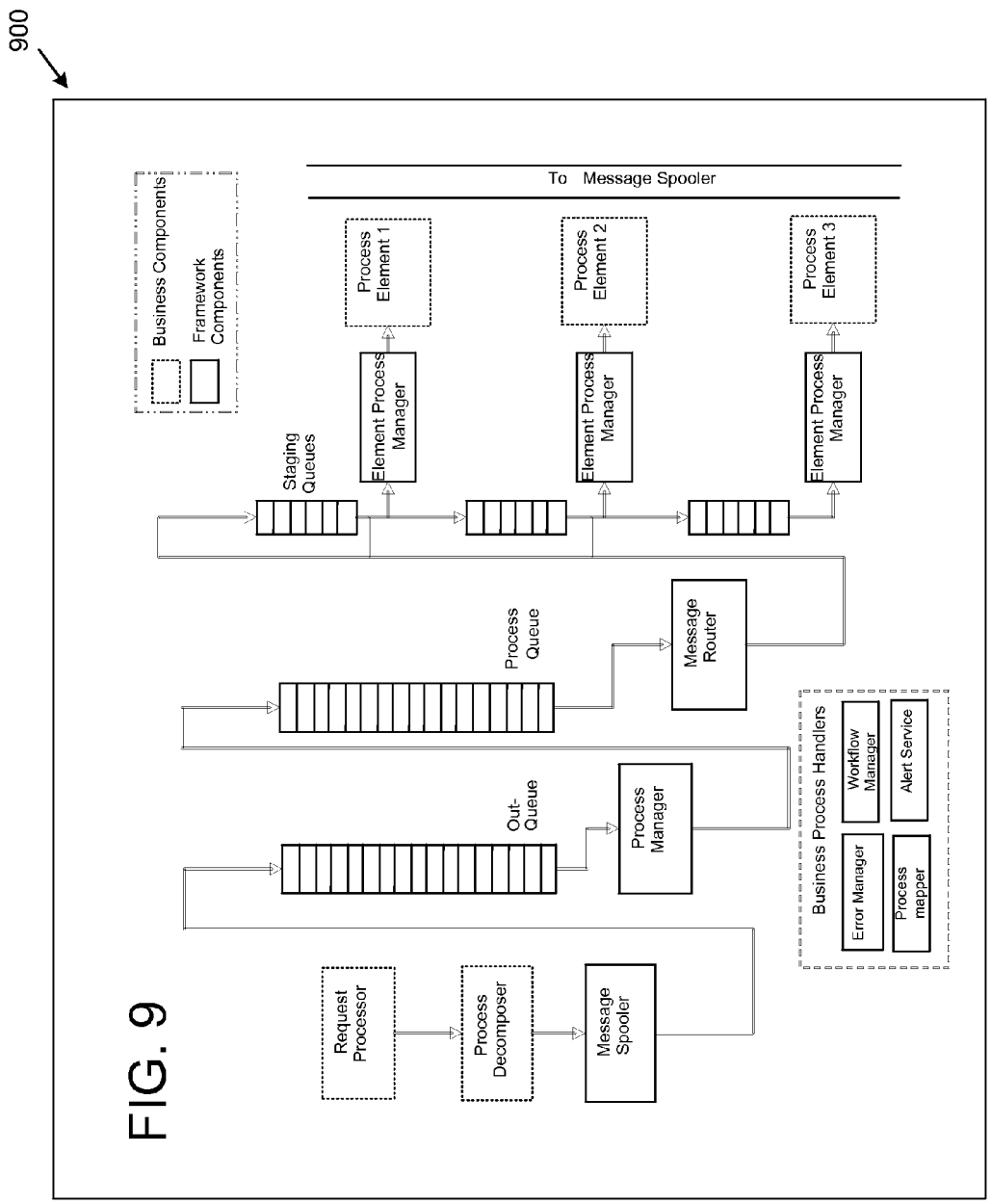
FIG. 9 is a block diagram of a system implementing the technologies described herein.

FIG. 9 is a block diagram of a system 900 implementing the technologies described herein. The example includes a request processor, process decomposer and message spooler.

Messages arrive on the out-queue and are processed by a process manager in cooperation with business process handlers (e.g., an error manager, a workflow manager, a process mapper, and an alert service), to place messages on a process queue.

Messages on the process queue are routed by the message router to the appropriate staging queues (e.g., subtask queues) on the subtask nodes, which have respective element process managers (e.g., subtask processor managers) and process elements (e.g., subtask processors).

The process elements can send messages back to the message spooler for additional subtask processing or to indicate the progress of message processing.

Several message queues are used to transport XML-based messages across the systems. Standard message queuing products such as MICROSOFT Message Queuing (MSMQ) and IBM's MQ-Series can be used to provide the messaging backbone of the system.

The process decomposer is a business process-specific component that decomposes an incoming request to form multiple XML messages. The messages are posted onto the first message queue in the framework: the out-queue.

The out-queue is a low-buildup queue where messages are immediately picked up by the process manager and, based on the type of message, the process manager invokes a respective business process handler. The business process handlers can be business process-specific components that control the overall business process. A business process handler can take the form of a workflow orchestrator that defines the sequences of process stages. Or, the business process handler can be an error handler configured to handle different kinds of system failures.

The business process-specific components can be easily plugged into the defined architecture, and can address an unlimited number of business-process specific scenarios. Such decoupling of the business process management from the rest of the system enables the system to be extended to any type of business rules associated with the business process definition.

The message can be passed onto the process queue, which can be another low build-up queue from which messages are immediately picked up by the message router, which routes the message on to its destination business process nodes (e.g., subtask nodes). Each business process node owns a message queue (e.g., subtask queue), which is a staging queue. Messages build up in the staging queues as the router routes the messages as they are dropped onto the process queue.

Message processing from the staging queues can be handled by framework components that take care of throttling messages based on the load management policy that is adopted.

Framework Components

In the example, the framework components do not implement any business logic (e.g., business process-specific logic). Their primary responsibility is providing a base platform that handles messaging management, load balancing (e.g., node level throttling), scalability, and the like.

Once the process has been decomposed, the business components can invoke the message spooler to spool the messages onto the messaging backbone. The framework adds the framework-specific message qualifiers onto the message and posts the message into the out-queue.

The process manager is responsible for invoking the corresponding business process handlers. Decoupling the framework from the process definition allows custom implementations to be plugged into the framework with little changes to the system. The implementation of the process management can be a pipelined implementation (e.g., serial processing) in which different process handlers can be attached to the processing pipeline. The process management components can post the message onto the process queue, where the messages are picked up by the message router.

The message router can map the message to its destination processing queue. The mapping can be provided as configuration metadata. The metadata can associate a type (e.g., subtask type, message type, or the like) with a particular subtask message queue. The router component locates the queue to which the message is to be posted and sends the message to the queue.

The process manager and message router can be implemented as singletons (e.g., running only one instance) hosted on only one machine. The components can be implemented as low load components to avoid performance degradation.

The element process manager (e.g., a subtask processor manager) can create instances of the process elements (e.g., subtask processors). Each business process node (e.g., task node) can be managed by an instance of the element process manager. The element process manager can also take care of load management by throttling the number of parallel instances of the process elements. The process elements and the process manager can be deployed in multiple machines to enable the system to scale out. The implementation of the process execution can be pipelined with preprocessing and post-processing stages introduced for any of the business processing nodes. Once the process element has completed, the status can be updated via a message (e.g., by the process manager), and the message spooler can be invoked to post the message into the out queue.

Business Components

The business components can handle business process-specific functionality. Requests can be handled by a request processor, which in turn invokes the process decomposer. The process decomposer decomposes the request into finite discrete messages and invokes the spooler. On the processing end, the process executants (e.g., process elements) execute the specific business rules and transformations on the data.

Example 21

Exemplary Method of Processing a Task Request

Figure 10:
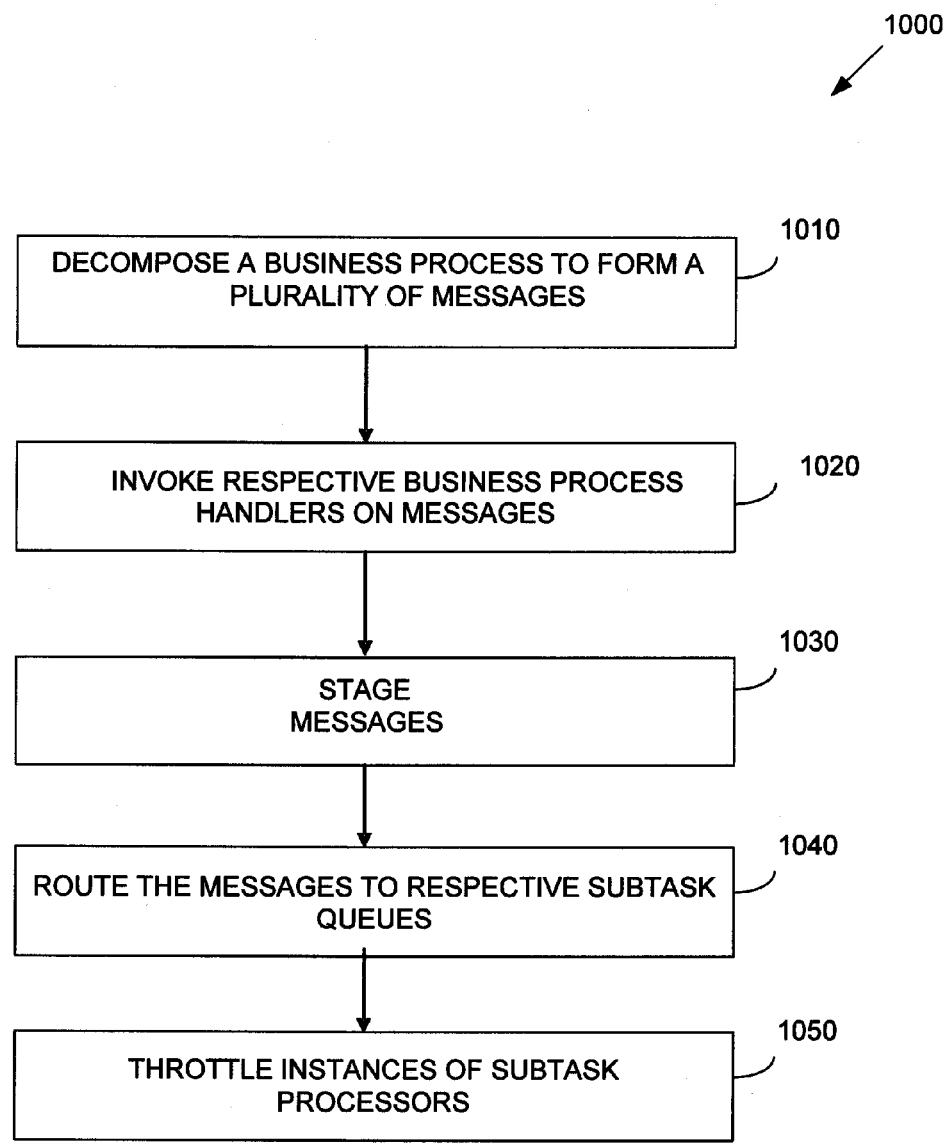
FIG. 10 is a flowchart of an exemplary method of processing a task with decomposition and throttling of instances of subtask processors.

FIG. 10 is a flowchart of an exemplary method 1000 of processing a task with decomposition and throttling of instances of subtask processors.

At 1010, a business process task is decomposed into a plurality of messages. At 1020, a respective business process handler is invoked to process the message.

At 1030, the messages are staged.

At 1040, the messages are routed to respective subtask queues, where they are processed.

At 1050, instances of the subtask processors are throttled. For example, a subtask processor for one type of subtask can be limited to a particular number of instances, and a subtask processor for another type of subtask can be limited to a different number of instances.

Example 22

Exemplary Internodally Heterogeneous Environments

In any of the examples herein, node processing can be accomplished in a heterogeneous environment. For example, an internodally heterogeneous environment, an intranodally heterogeneous environment, or both can be implemented.

Figure 11:
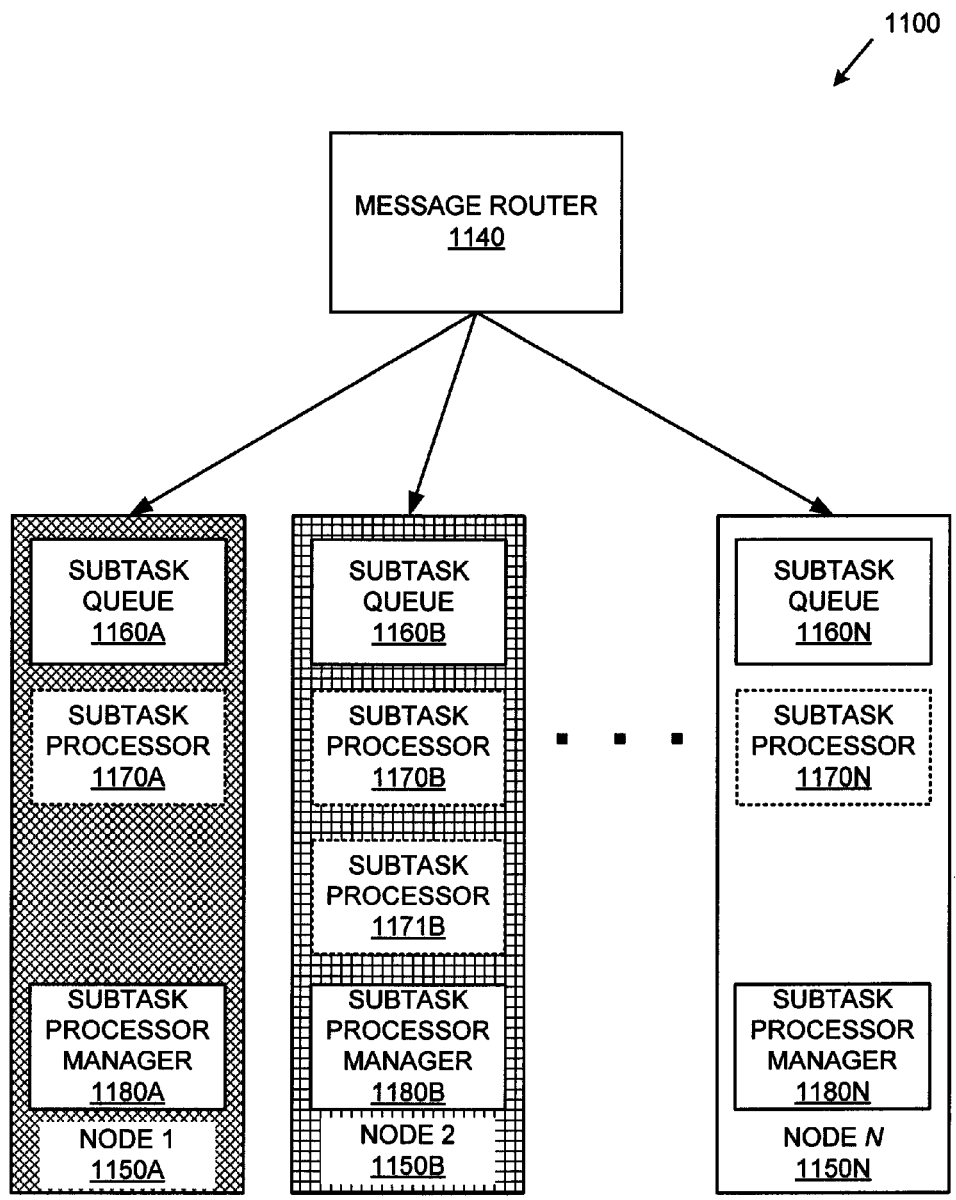
FIG. 11 is a block diagram of an exemplary system implementing the technologies described herein in an internodally heterogeneous environment.

FIG. 11 is an exemplary system 1100 implementing the technologies in an internodally heterogeneous environment. In the example, the message router 1140 routes messages representing subtasks to the nodes 1150A-N. The subtasks queues 1160A-N, subtask processors 1170A-N, 1171B, and the subtask processor managers 1180A-N can operate on the nodes 1150A-N similarly to those shown in FIG. 3. However, within the nodes 1150A-N, there is a heterogeneous mixture of platform types. For example, node 1 1150A can be implemented on one platform type, and node 2 1150B can be implemented on a different platform type.

The different platform types can be different execution environment types (e.g., .NET and JAVA Platform, Enterprise Edition). The nodes can support a heterogeneous mixture of messaging backbones (e.g., MSMQ and MQ-Series). The nodes can support a heterogeneous mixture of operating systems (e.g., WINDOWS and UNIX-based operating systems). In such cases, the node can be of one execution environment type, messaging backbone type, operating system type, or combination thereof. Another node can be of a different execution environment type, messaging backbone type, operating system type, or combination thereof.

A wrapper can translate messages (e.g., according to a messaging schema) from one platform to another in a heterogeneous platform system. For example, if the message router 1140 sends messages to two nodes (e.g., 1150A, 1150B) having different messaging backbones or execution environments, a wrapper can be used between components implementing different backbone or execution environment types.

Example 23

Exemplary Intranodally Heterogeneous Environments

Figure 12:
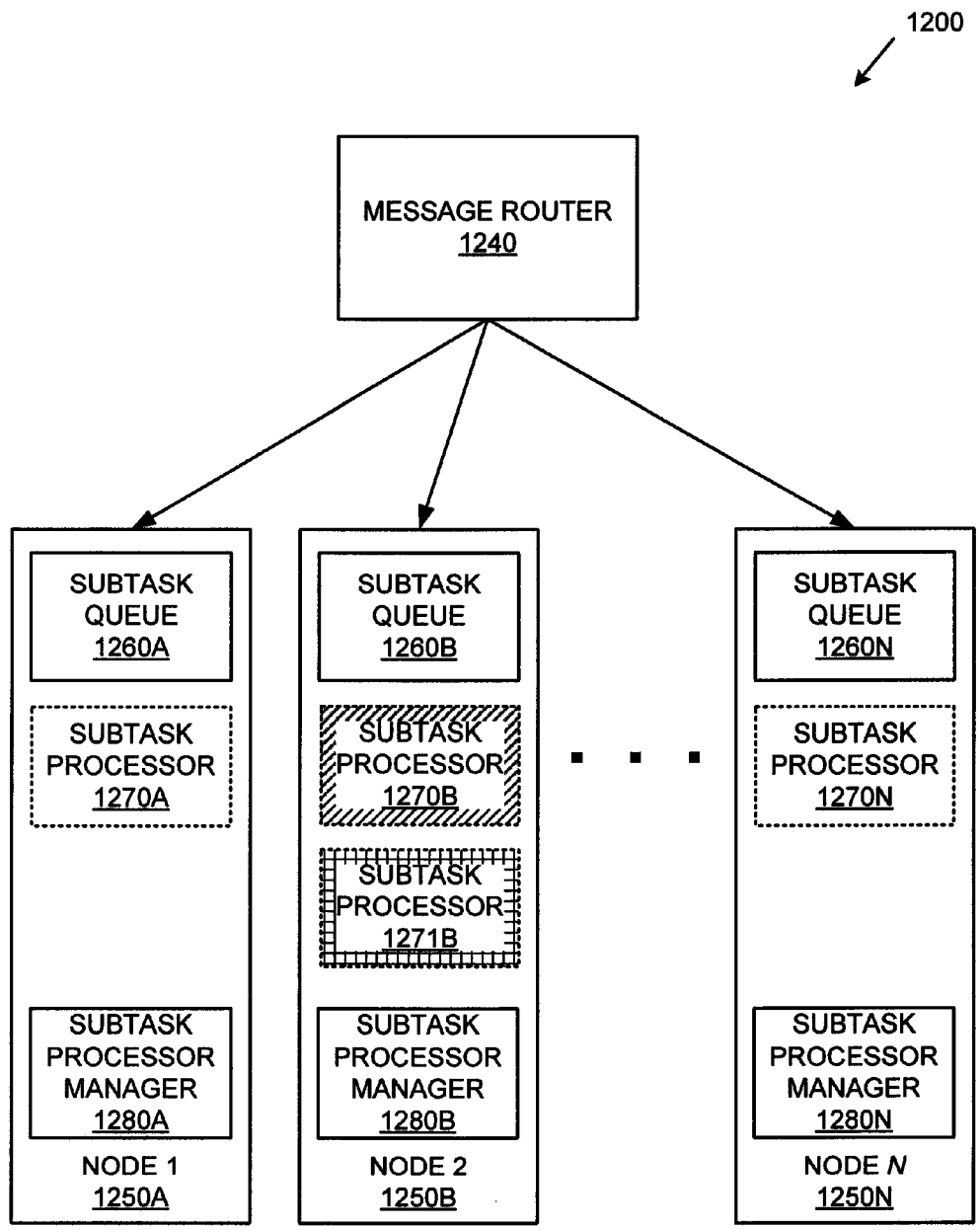
FIG. 12 is a block diagram of an exemplary system implementing the technologies described herein in an intranodally heterogeneous environment.

In any of the examples herein, the technologies can be implemented in an intranodally heterogeneous environment. FIG. 12 is an exemplary system 1200 implementing the technologies in an intranodally heterogeneous environment. The components 1240, 1250A-N, 1260A-N, 1270A-N, 1271B, 1280A-N can be similar to those shown in FIG. 3

Within a single node, there can be a heterogeneous mixture of platform types. So, for example, the subtask processor 1270B can be of a different platform type than the subtask processor 1271B. The different platform types can be different execution environment types (e.g., .NET and JAVA Platform, Enterprise Edition). The node can support a heterogeneous mixture of messaging backbones (e.g., MSMQ and MQ-Series). The node can support a heterogeneous mixture of operating systems (e.g., WINDOWS and UNIX-based operating systems). In such cases, one part of the node (e.g., subtask queue, subtask processor, subtask processor manager) can be of one execution environment type, messaging backbone type, operating system type, or combination thereof. Another part of the node can be of a different execution environment type, messaging backbone type, operating system type, or combination thereof.

The subtask processor manager 1280B can be of the same platform type as the subtask processors that it manages. Thus, there can be two different subtask processor managers in a single node, each managing one or more instances of subtask processors.

Intranodal and internodal heterogeneity can be combined as desired. Such an arrangement can be useful to optimally use the available computing resources.

Example 24

Exemplary Implementadon of Heterogeneous Platforms

In any of the examples herein, the decomposed business process can be executed in a heterogeneous platform which can involve more than one execution environment type. Thus, a business process may involve finite logic that is built by combining different subtasks implemented in one or more different platform types. The business process can be defined, executed, and managed with the processing nodes running under different environment types while still providing node-level throttling.

Example 25

Exemplary Implementation of Heterogeneous Platforms: Accounting

A data rationalization application can be implemented in a heterogeneous environment. For example, if an enterprise has different departments dealing with their own account information for spending (e.g., IT spending or the like), the account information can be fetched from such heterogeneous information periodically (e.g., weekly, fortnightly, monthly, or the like). Account calculations for the different departments may be resource and high processing intensive. In order to provide an enterprise data level view of the account information and consolidated account information, a data rationalization process engine can collect data from the various systems.

The application can communicate with multiple application components in a heterogeneous environment to collect data and do calculation logic (e.g., for the complete enterprise).

In the example, a portion of the applications reside on UNIX-based systems running JAVA Platform, Enterprise Edition application servers, a portion of the applications are on WINDOWS-based systems running MICROSOFT NET-based applications, and another set of applications are on WINDOWS-based system running JAVA Platform, Enterprise Edition application servers. The data processing for the different applications follows different business rules and processes.

A set of MSMQ message queues are configured on a MICROSOFT WINDOWS-based system. Alternatively, these could be a set of IBM MQ-Series queues. A .NET-based subtask process manager and message router are implemented as framework components. Node level framework components are implemented in two different flavors (e.g., .NET and JAVA Platform, Enterprise Edition); they are configured to work with (e.g., read, write, or the like) the appropriate message queues.

A data rationalization service can be triggered periodically by a scheduler. The triggering can invoke a business component to generate a plurality of messages (e.g., one for each department component instance). Based on the configured business process definition, a mapper component can map the message to its destination queue, and a message router routes the message to the appropriate queue of a subtask node.

The subtask processor manager at the node can pick up its respective messages and spawn off instances of the subtask processors. The subtask node manager can be in the same platform (e.g., of the same platform type) as the subtask processors that it manages.

Example 26

Exemplary Advantages of Heterogeneous Platforms

Heterogeneous platforms can enable node level throttling, even if individual nodes are from different runtime environments.

To maximize resource utilization, a single node executing subtasks of the business process can be deployed on heterogeneous platforms (e.g., the same logical subtask may execute out of a WINDOWS 2003 server and a UNIX server by optimally utilizing the resources).

The solution can provide an integration platform for business processes that span across multiple platform types and still take advantage of the throttling capabilities of the solution. Enterprise application integration (EAI) can thus be achieved by the technologies.

Example 27

Document Management System

Figure 13:
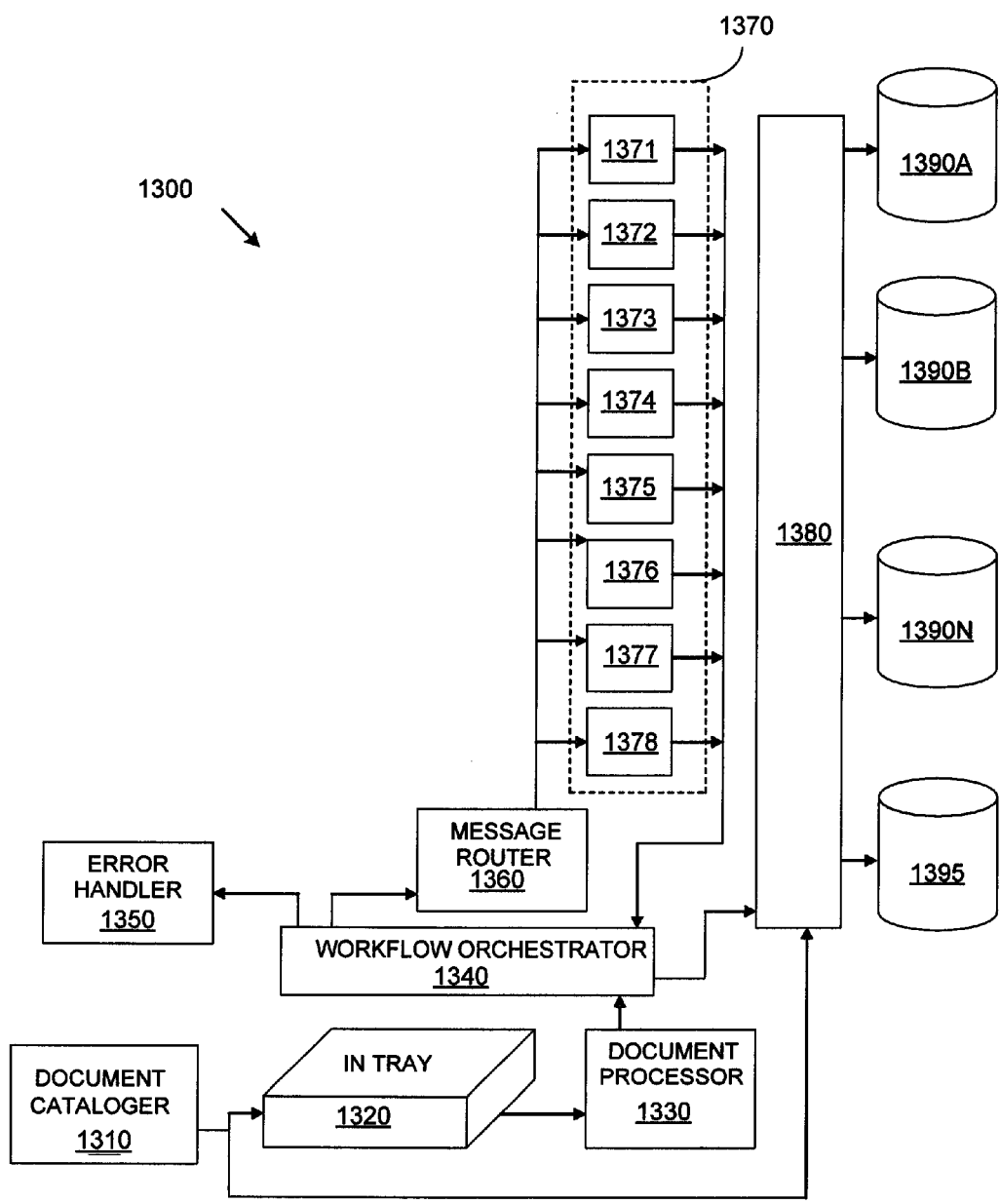
FIG. 13 is a block diagram of a document management system.

FIG. 13 is a block diagram of a document management system 1300. The document management system extracts data from a huge volume of documents for data analysis and updates a database with information for further data processing. The analysis stages are decomposed as process elements and deployed in a cluster of machines for scalability and performance. The application was developed using the MICROSOFT .NET platform.

The workflow is implemented using a pipeline architecture. The different stages in the pipe are triggered using an asynchronous dispatch mechanism. The workflow components use MICROSOFT MSMQ as the workflow messaging backbone to implement the asynchronous message dispatch framework.

Process Element—Document Cataloguer

The document cataloguer 1310 is an automatic process which organizes files into groups based on their attributes. The document cataloguer 1310 accomplishes the following:

Documents land in a specified directory in a file server along with their metadata information. The user logs onto a Web-based user interface and views the catalogued file list (e.g., files are presented as links, so that the user can verify the files). The user initiates the import process once the information presented is verified by the user. The cataloguer 1310 then moves the files into the in-tray folder 1320.

Process Element—Document Processor

The document processor 1330 picks up the documents from the in-tray 1320 (e.g., automatically) and creates folders for respective documents in the working area; moves the documents to their corresponding folders in the working area; and creates the initial entries in the database for the documents. For each document, a call on a method on the workflow orchestrator 1340 by the document processor 1330 starts processing.

Workflow Element—Workflow Orchestrator

The workflow orchestrator 1340 orchestrates the workflow. Stages in the workflow are configurable (e.g., either through an application configuration file or through values from the control database). The document processor 1330 calls a method on the workflow orchestrator 1340 to initiate the processing. The orchestrator 1340 updates the existing data access layer 1380 to indicate status of processing.

Workflow Element—Process Queue

The process queue (e.g., between the workflow orchestrator 1340 and the message router 1360) is a MICROSOFT Message Queuing queue on the application server. It is a transaction queue. The queue holds messages that are dispatched to the respective process elements 1371-1378 by the message router 1360.

An error queue (e.g., between the workflow orchestrator 1340 and the error handler 1350) hold messages indicating errors encountered when processing messages. Error handling is processed by the error handler 1350.

Workflow Element—Message Router

The message router 1360 reads messages from the process queue and, based on the message type, it posts a message to the individual process' queue (one of the queues between the message router 1360 and the respective process elements 1371-1378). Each of the process elements 1371-1378 have a queue for its processing.

The process elements 1371-1378 pick up messages from the queue based on the possible parallelism it is configured to operate on. For example, a format converter can be configured to execute three simultaneous document conversions at a time, and a signature analyzer might be configured to execute only one analysis at a time.

This indirection enables the system to scale out process-wise. Some of the process elements can be deployed on different machines to improve performance of the system. These changes can be accomplished via changes to the configuration file and installation of appropriate components on the appropriate servers. Multiple process elements can execute in parallel. The output of a previous stage is the input to the current stage. A stage puts the document through a transformation, and the transformed document is saved in the working folder. The next stage uses the saved document as input for its input.

Process Elements of Librarian

A respective process element 1371-138 performs a respective specific task type, and is a stage in the pipe. A process element (e.g., 1371) picks up messages from its queue (e.g., a MICROSOFT MQ queue). The process element can process up to n number of messages at a time based on the number of parallel instances it is configured to spawn. New process elements are dynamically added to the system as and when the need arises.

Adding a new process element (e.g., for processing a new subtask type) is accomplished by updating the configuration file of the orchestrator 1340 and installing the new process element.

In the example, the process elements are part of librarian functionality 1370.

Process Elements

The following process elements are implemented in the system 1300:

A format converter 1371 converts an input document into a Unicode text document.

A document cleanup 1372 executes macros for a document file to clean up a document.

A signature analyzer 1373 generates a document signature (e.g., a hash-like value indicating attributes of the document) and updates the signature in the database. It also determines whether the document is a duplicate.

A sentence breaker 1374 splits each document into separate sentences to facilitate insertion into a sentence table.

A DB writer 1375 uploads the sentences into a temporary table in the appropriate language database using a bulk insert technique. A BCP utility is used to transfer data from a flat file to the database. The flat file is typically located in the database server whose path is mentioned in the Utils table of the language database.

A sentence analyzer 1376 analyzes sentences in the temporary table, where the sentences were bulk inserted by the DB Writer 1375 and under-broken and over-broken sentences are detected. The analyzer 1376 also marks such sentences as incorrect sentences and stores a flag into the temporary table as well. Finally, the sentences are bulk inserted again from the Temporary table to the Sentence table of the Language database.

A sampler 1377 and status reporter (e.g., for email) 1378 are also included.

Other

The system 1300 also includes an existing data layer 1380 and databases for different human languages 1390A-1390N (i.e., French, Japanese, Spanish, German, and English). A library database 1395 is also be included.

The document cataloguer 1310 creates a DocumentID for a document, uploads metadata from the DocumentID into the Language database and classifies documents to different folders based on the metadata.

The document processor 1330 puts files in respective folders and initiates import by creating an entry in the process queue.

The process elements read information from the library database 1395 and the Language databases 1390A-N as appropriate through the existing data access components 1380.

To request a corpus, the user logs the request from a user interface. The sampler 1377 reads the message from the queue generated by the CorpusRequestManager and orchestrator through the workflow orchestrator 1340.

Mail messages are queued up and dispatched by the status reporter 1378 component.

Example 28

Data Migration System

Figure 14:
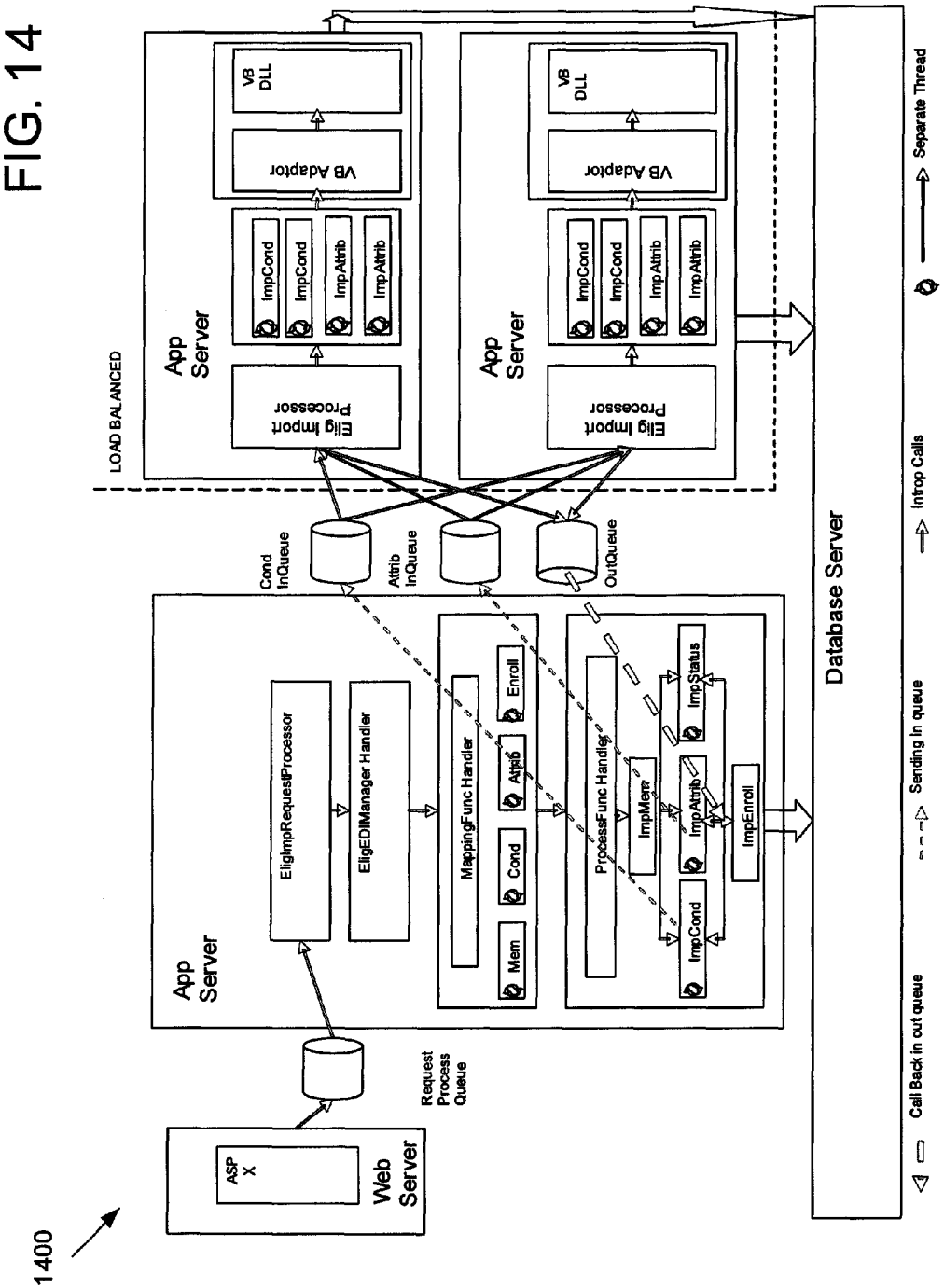
FIG. 14 is a block diagram of a data migration system.

FIG. 14 is a block diagram of a data migration system 1400. The data migration system migrates a high volume of data from a business partner's database to the production database after performing business terms translation, analysis, false record omission, complex data processing, and database updating. The complex data processing requires considerable processor power, so a highly scalable and high performance solution is desired. So, complex data processes are run in parallel as process elements. The application is developed in the MICROSOFT NET platform.

EligEDIManager Handler

The EligEDIManager Handler receives messages from the request processor and orchestrates the overall data translation and updating process into productions tables.

Mapping Func Handler

The Mapping Func Handler takes care of orchestrating the data translation process. Most of the functions are batch operations on the database.

Process Func Handler

The Process Func Handler orchestrates the data updating after complex data processing. The complex data processing is divided as processor intensive operations and database intensive batch operations. Database intensive batch operations are processed on a single machine, and processor intensive operations are distributed across a cluster of machines using the decomposed architecture described herein to achieve scalability and performance. The processor intensive operations are run in parallel across multiple machines depending on the record bucket size associated with each machine, which can be configured.

ImpCond and ImpAttrib

ImpCond and ImpAttrib are the process elements that take care of data processing and updating into the database depending on the record bucket size obtained from the message in the queue. The number of instances that can run in a particular machine is configured. Configuration can be optimized in production according to the load on the process and machine capacity Mem (membership), Cond (medical condition management), Attrib (attributed management), and Enroll (enrollment) are various business processes implemented in the system.

Example 29

Statement Generation System

Figure 15:
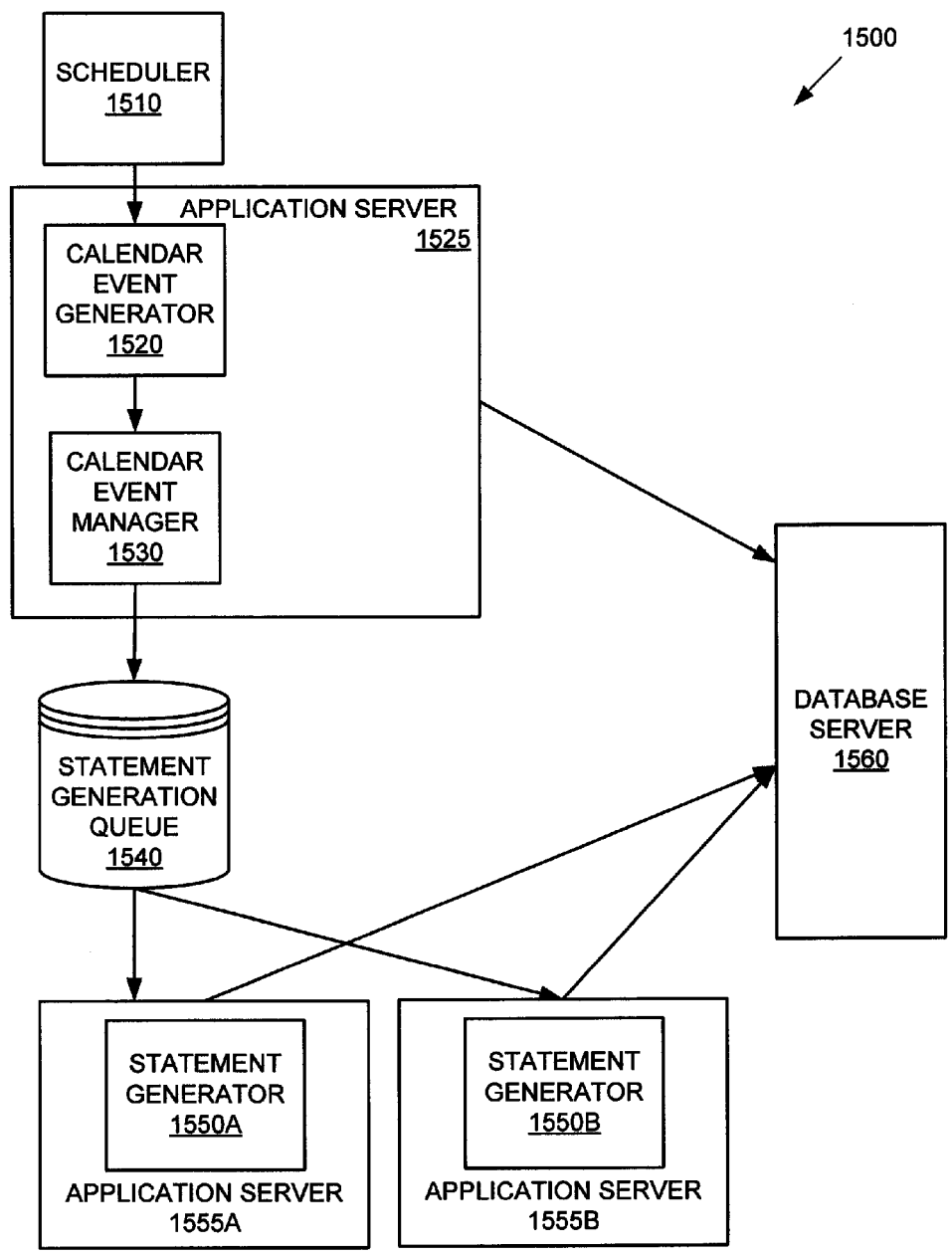
FIG. 15 is a block diagram of a high volume statement generation system.

FIG. 15 is a block diagram of a high volume statement generation system 1500. The system 1500 can generate a very large volume of bank statements for business customers. Statement generation is to happen on the particular scheduled period (e.g., daily) depending upon the configuration for the customers. The statement generation process runs in multiple machines in order to support the huge volume of statement generation for scalability and performance. The application is developed in the J2EE platform.

Scheduler

The scheduler 1510 takes care of invoking a process (e.g., task) at a configured time. The scheduler invokes a calendar event generator 1520 to generate calendar events for the configured number of days (e.g., a month) at the configured time daily. Another process is invoked from the scheduler 1510 at a configured time daily to read the calendar events with properties as a statement generation and posts one or more messages to the statement generation queue 1540.

Calendar Event Generator

The calendar event generator 1520 is triggered daily from the scheduler 1510 at a specified time, and it generates the calendar events for the configured number of days. The generator 1520 and the manager 1530 run on the application server 1525.

Calendar Event Manager

The calendar event manager 1530 posts messages in the statement generation queue 1540 depending on the property of the calendar event. It is triggered daily from the scheduler 1510 at a specified time.

Statement Generator

The statement generator 1550A-B is a Message Driven Bean (MDB) that is deployed in a cluster of application servers 1555A-B. The MDB picks up messages from the queue 1540 and generates the statement for the customer from the message information. Because the MDB is deployed in a cluster, the load is distributed, and the processing is parallelized, which makes the system highly scalable and improves system performance to a large extent.

A database server 1560 stores data and hold results of processing.

Example 30

Exemplary Alternadve Description

Figure 16:
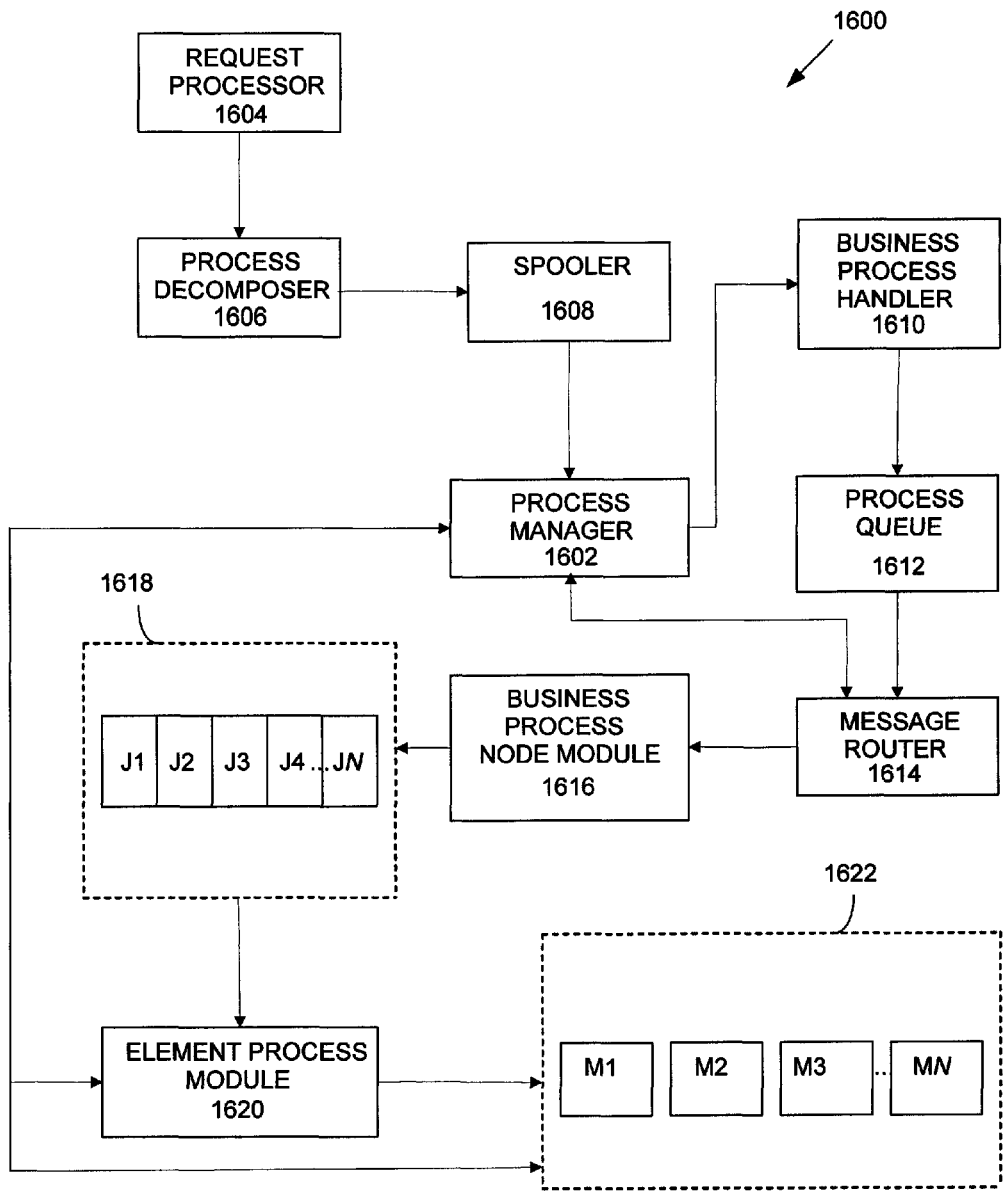
FIG. 16 is a block diagram of an exemplary system implementing the technologies described herein.

FIG. 16 is a block diagram illustrating a message driven distributed processing process decomposition system 1600 configured to provide a high performance and handle long running business processes. This alternative description uses different terminology to describe the technologies. The system 1600 decomposes the business process task into finite discrete work packets (e.g., subtasks). Furthermore, each sub-process (e.g., subtask) can be executed independently of other various processes. Additionally, a sub-process may work independently without depending on the other various processes. The described system can provide a scalable solution that can enable execution of multiple instances of various processes (e.g., subtask processors) on one or more machines.

The process decomposition system 1600 comprises a process manager 1602, a request processor 1604, a process decomposer 1606, a spooler 1608, a business process handler 1610, a process queue 1612, a message router 1614, a business process node module 1616, a queuing module 1618, an element process module 1620, and multiple machines module 1622.

For example, the message queues can be used to transport Extensible Markup Language (XML) based messages across one or more message systems. XML can provide a simple, flexible text format for exchanging a wide variety of data.

The request processor 1604 can receive requests from various sources. The process manager 1602 can be responsible for invoking corresponding business process handlers.

The process decomposer may be a business component that decomposes the requests from the request processor 1604, forming multiple messages. Also, the multiple messages further can be posted on to the spooler 1608 (e.g., a message queue) in the framework. The spooler 1608 can be a low build-up queue, whereby messages are immediately picked up by the process manager 1602.

Further, depending on the message type, the spooler 1608 can dispatch the message, invoking the business process handler. The business process handler 1610 can be a business component controlling the overall business process. In such a situation, the business process handler 1610 can take the form of a workflow orchestrator to define the sequences of process states. Or alternatively, the business process handler 1610 may take the form of an error handler to handle various system failures.

The business process handler 1610 may be easily plugged into a defined architecture. Decoupling the business processes from the other resources enables the system 1600 to be extended to any of a variety of business rules associated with the business process task definition.

Furthermore, the messages may be passed to the process queue 1612. The process queue 1612 can be another low build up queue, wherein the messages can be picked up by the message router 1614. The message router 1614 routes the messages to a respective destination business process modes module 1616. Additionally, in the business process nodes module 1616, the business process node may be linked to a message queue (e.g., a staging queue) of the queuing module 1618. In one embodiment, the messages are built up in the staging queues simultaneously as the router 1614 routes the messages, whereby the messages can be dropped in the process queue 1612. Processing messages from the staging queues can be handled by the framework components that take care of throttling messages based on load management.

The framework components can be implemented so that they do not implement any business logic. The framework components can provide a base platform that handles the jobs. After the process is decomposed, the business components can invoke the spooler 1608, which spools the messages on the messaging backbone.

The process manager 1602 can be responsible for invoking the corresponding business process handlers 1610. Decoupling the framework from the process definition allows custom implementations to be plugged into the framework with little changes to the system 1600. The implementation of the process management may be a pipelined implementation, whereby various process handlers may be attached to the processing pipeline. The process management components can post the message to the process queue 1612, whereby the messages may be picked up by the router 1614. The message router 1614 can map the messages to a respective destination processing queue or queuing module 1618. In the drawing, processes (e.g., subtasks) are indicates as jobs $J_1, J_2, \ldots J_n$.

The process manager 1602 and the message router 1614 may be implemented as singleton components (e.g., one instance is running at a time) and host on only one machine (e.g., when implemented as components generating a low load).

The element process module 1620 (e.g., a task processor manager) may be a framework component that is responsible for creating instances of the process elements. A node can be managed by an instance of the element process module 1620. The element process module 1620 can also take charge of load management by throttling the number of parallel instances of the process elements (e.g., subtask processors). Furthermore, the process elements and the process manager 1602 can be deployed on various machines to enable the system to scale out (e.g., onto a cluster of computers).

The implementation of the process execution may be pipelined with preprocessing and post-processing stages for respective business processing nodes. On completion of the process execution by the process element, updating of the status to the message by the process manager 1602 and the invocation of the message spooler 1608 to post the message to the out queue may be performed. The business components can handle business functionality.

The collection of various requests from various sources can be handled by the request processor 1604, which involves the process decomposer 1606. The system 1600 can decompose multiple requests into finite discrete messages and invoke the spooler 1608 on one side. On the processing side, the process executants of the system 1600 (e.g., in the form of process elements) execute specific business rules and perform transformations on the data. The multi machines module 1622 can be one or more collections of machines (e.g., computers), whereby multiple instances of the various processes may be executed.

Example 31

Exemplary Perspectives

Although some of the examples assume the perspective of a particular device or component, the technologies described herein can be implemented from other perspectives. For example, although the terminology "sending a message" is used from the perspective of a message router, such an act could also be described as "receiving a message" from the perspective of the subtask node.

Example 32

Exemplary Databases

In any of the examples herein, a backend database can be any store of data used by the system to accomplish a business process. For example, such a database can store information about resources related to conducting business (e.g., customer data, statements, documents, product data, order data, expense data, inventory data, and the like).

Example 33

Exemplary Solution

In any of the examples herein, process (e.g., task) decomposition can be implemented. A task can be decomposed into finite discrete work packets (e.g., subtasks). A subtask can be capable of execution independent of the other subtasks. Any subtask can work independently of others (e.g., without any dependencies on the other subtasks). A message-driven distributed processing solution can address the benefits described herein when implementing long-running business processes.

Example 34

Exemplary Benefits

Implementations can provide any of the following benefits. The complexities of long-running transactions can be addressed with respect to scalability, performance, and load balancing. A low-cost implementation of a decomposable batch processing system can be provided.

Flexible Architecture

A flexible decomposed process architecture can enable the system to react quickly to process changes. The architecture can be fit into various requirements such as workflow and load distribution. Thus, the architecture can be flexible. The architecture can accommodate both synchronous and asynchronous processing, which can be handled by the workflow logic added to the framework.

Low Cost

A batch processing engine or workflow engine can be avoided. The architecture described herein can scale out (e.g., additional computers can be added). Thus, having to scale up (e.g., increasing computer hardware resources) can be avoided, reducing overall costs.

Scalability

The architecture can support both scale out and scale up of the deployed machines, which makes it highly scalable. Process-level throttling features can help to identify the process load and enable proper decisions about the deployment to provide appropriate scalability.

Performance

The decomposed process architecture can provide parallelization in the process execution, which can increase the overall performance of a long-running transaction. Performance can be improved further by scaling out and scaling up, which are both supported.

Robust Environment

The technologies can provide a robust, mature, transactional environment by using queuing technology in a message medium with assured delivery.

Failover Capability and Load Balancing

The architecture can provide high failover capability when deployed in a cluster of machines. Load balancing capabilities are provided at the process (e.g., subtask) level, which gives an administrator flexibility over how to manage the system on separate machines depending on the load of the server.

Ease of Use

Configuration files with system settings can be implemented as XML files to ease deployment and administration of the system. For example subtask processing and balancing can be managed via XML files.

Node Level Throttling

Functional decomposition of a task into smaller, isolated independent work packets as subtasks and throttling at the subtask level with respect to the resource utilization is very useful. A workflow may have some subtasks that are resource intensive and some that are not, so providing subtask-level load distribution is helpful.

Load Distribution

Subtasks can have specific requirements with respect to resource utilization. Some subtasks types require large resources for processing, and other subtask types require less. Such resources can include memory, third party system processing, and external peripherals. The described technologies can distribute resources across machines and direct particular types of tasks to groups of one or more computers, which can be customized to have the appropriate resources.

Process Engine in a Heterogeneous Environment

Some subtasks can require a different platform type due to an organizational goal, a business goal, and infrastructure with respect to one another. As described herein, different subtasks can be directed to different platforms types.

Node Level Plug and Play

An individual subtask can be replaced without affecting the entire flow. For example, subtask processors can be replaced with different ones without major impact on the roll out.

Scalability and Performance

Task level decomposition and throttling help make use of existing resources efficiently. To cater to future needs in case of an increase in load, additional resources (e.g., including additional computers and the like) can be added, and the system can be tuned.

Example 35

Exemplary Computing Environment

Figure 17:
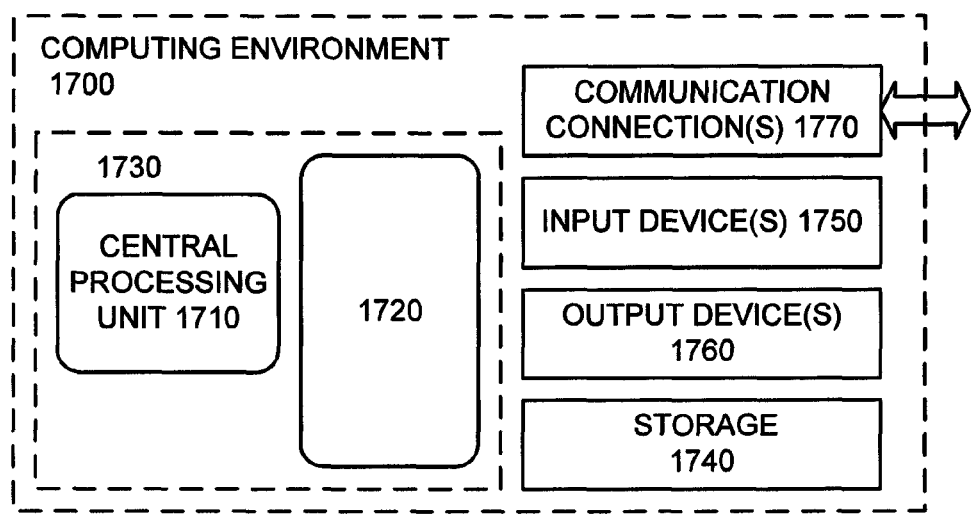
FIG. 17 is a block diagram of an exemplary suitable computing environment for implementing any of the technologies described herein.

FIG. 17 illustrates a generalized example of a suitable computing environment 1700 in which the described techniques can be implemented. The computing environment 1700 is not intended to suggest any limitation as to scope of use or functionality, as the technologies may be implemented in diverse general-purpose or special-purpose computing environments. Mobile computing devices can similarly be considered a computing environment and can include computer-readable media. A mainframe environment will be different from that shown, but can also implement the technologies and can also have computer-readable media, one or more processors, and the like.

With reference to FIG. 17, the computing environment 1700 includes at least one processing unit 1710 and memory 1720. In FIG. 17, this most basic configuration 1730 is included within a dashed line. The processing unit 1710 executes computer-executable instructions and may be a real or a virtual processor. In a multi-processing system, multiple processing units execute computer-executable instructions to increase processing power. The memory 1720 may be volatile memory (e.g., registers, cache, RAM), non-volatile memory (e.g., ROM, EEPROM, flash memory, etc.), or some combination of the two. The memory 1720 can store software implementing any of the technologies described herein.

A computing environment may have additional features. For example, the computing environment 1700 includes storage 1740, one or more input devices 1750, one or more output devices 1760, and one or more communication connections 1770. An interconnection mechanism (not shown) such as a bus, controller, or network interconnects the components of the computing environment 1700. Typically, operating system software (not shown) provides an operating environment for other software executing in the computing environment 1700, and coordinates activities of the components of the computing environment 1700.

The storage 1740 may be removable or non-removable, and includes magnetic disks, magnetic tapes or cassettes, CD-ROMs, DVDs, or any other computer-readable media which can be used to store information and which can be accessed within the computing environment 1700. The storage 1740 can store software containing instructions for any of the technologies described herein.

The input device(s) 1750 may be a touch input device such as a keyboard, keypad, touch screen, mouse, pen, or trackball, a voice input device, a scanning device, or another device that provides input to the computing environment 1700. For audio, the input device(s) 1750 may be a sound card or similar device that accepts audio input in analog or digital form, or a CD-ROM reader that provides audio samples to the computing environment. The output device(s) 1760 may be a display, printer, speaker, CD-writer, or another device that provides output from the computing environment 1700.

The communication connection(s) 1770 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media include wired media such as a wired network or direct-wired connection, and wireless media such as acoustic, RF, infrared and other wireless media. Combinations of any of the above can also be included within the scope of computer readable media.

The techniques herein can be described in the general context of computer-executable instructions, such as those included in program modules, being executed in a computing environment on a target real or virtual processor. Generally, program modules include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing environment.

Methods in Computer-Readable Media

Any of the methods described herein can be implemented by computer-executable instructions in one or more computer-readable media (e.g., computer-readable storage media or other tangible media).

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of these claims.

We claim:

1. A method comprising:
receiving a request to process a business process task;
decomposing the business process task into at least one discrete subtask, wherein the at least one discrete subtask is associated with one out of a plurality of subtask types and the at least one discrete subtask is represented by a message;
based at least on the subtask type, routing the message to a subtask node dedicated to processing subtasks of the subtask type associated with the at least one discrete subtask;
wherein the subtask node is one of a plurality of subtask nodes dedicated to processing subtasks of respective subtask types, and the subtask node is separately throttleable to control resources applied by the subtask node for processing subtasks of the subtask type;
wherein the plurality of subtask nodes comprises a heterogeneous mixture of platform types and a heterogeneous mixture of messaging backbones; and
wherein the subtask node comprises a heterogeneous mixture of platform types and a heterogeneous mixture of messaging backbones.

2. The method of claim 1 wherein throttling comprises:
creating a particular number of instances of subtask processors according to a configurable configuration setting.

3. The method of claim 2 further comprising:
monitoring, with the instances of subtask processors, a single queue containing messages representing subtasks of a single subtask type to be executed.

4. The method of claim 1 further comprising:
throttling the subtask node independently of other subtask nodes;
wherein the subtask node executes on a different platform type than at least one other of the subtask nodes.

5. The method of claim 4 wherein throttling comprises:
limiting creation of parallel instantiated instances of subtask processors to a particular number at one subtask node executing in a first execution environment type; and
limiting creation of parallel instantiated instances of a different subtask processor to a different particular number at an other subtask node executing in a second, different execution environment type.

6. The method of claim 5 wherein creation limitation of instances is achieved by determining whether a number of instances has reached a configurable threshold.

7. The method of claim 6 wherein the threshold is configurable at a subtask node level.

8. The method of claim 1 wherein the plurality of subtask nodes comprise a heterogeneous mixture of operating system types.

9. The method of claim 1 wherein:
the routing is based on configuration metadata associating a task type with a subtask message queue at a particular subtask node; and
the subtask message queue is monitored by a number of subtask processors, wherein the number is configurable by an administrator to distribute load among the subtask nodes.

10. The method of claim 9 wherein:
the subtask processors monitoring the subtask message queue span a plurality of messaging backbone types.

11. The method of claim 9 wherein:
a plurality of subtask nodes of different platform types reside at a single computer.

12. The method of claim 1, respective of at least one of the plurality of subtask nodes comprising at least one first subtask processor of a first platform type and at least one second subtask processor of a second platform type.

13. The method of claim 12, respective of the at least one subtask nodes further comprising a first subtask processor manager of the first platform type configured to manage the at least one first subtask processor and a second subtask processor manager of the second platform type configured to manage the at least one second subtask processor.

14. One or more non-transitory computer-readable storage media having encoded thereon computer-executable instructions for implementing a software system comprising:
a plurality of business process-specific components comprising functionality for processing subtasks of a plurality of subtask types related to a business process, wherein at least one of the business process-specific components is executable in an execution environment type different from at least one other of the business process-specific components; and
a plurality of framework components generic to the business process, wherein the framework components comprise a message router and a plurality of subtask processor managers configured to independently throttle processing of subtasks of a particular subtask type on a subtask node comprising a heterogeneous mixture of platform types and a heterogeneous mixture of messaging backbones, the subtask node being one of a plurality of subtask nodes, wherein the plurality of subtask nodes comprises a heterogeneous mixture of platform types and a heterogeneous mixture of messaging backbones.

15. The one or more computer-readable storage media of claim 14, the software system further comprising:
a business process-specific task decomposer configured to decompose task requests into a plurality of subtasks associated with respective subtask types.

16. The one or more computer-readable storage media of claim 15 wherein:
the framework components are operable to processes parallel task decomposition and sequential task decomposition.

17. An apparatus comprising:
a subtask node comprising means for processing subtasks of a first subtask type related to a business process in a first execution environment type and a second execution environment type;
means for processing subtasks of a second subtask type, different from the first subtask type, related to a business process in a third execution environment type different from the first execution environment type; and
a plurality of framework components generic to the business process, wherein the framework components comprise means for routing messages and means for independently throttling processing of subtasks of a particular subtask type;
wherein the first, second, and third execution environment types further comprise a heterogeneous mixture of messaging backbone types.

18. One or more non-transitory computer-readable storage media storing computer-executable instructions causing a computer to perform a method for load balancing business process task processing, the method comprising:
receiving a request to process a business process task;
decomposing the business process task into one or more messages representing one or more subtasks of the business process task;
with a business process manager framework component in concert with a business process handler, orchestrating processing of the one or more subtasks, wherein processing comprises generating a directed message for the one or more subtasks, wherein the directed message comprises a type indicative of a subtask node to which the directed message is to be directed;
with a message router, routing the directed message to the subtask node to which the directed message is to be directed;
at the subtask node, receiving the directed message at a subtask queue; and
retrieving the directed message from the subtask queue for processing by an instance of a subtask processor of the subtask node, wherein retrieving is limited by a limit set on a number of instances of the subtask processor to be created within the subtask node by a per-subtask node configurable setting;
wherein the business process task is performed with a plurality of subtask nodes, the plurality of subtask nodes comprising a heterogeneous mixture of platform types and a heterogeneous mixture of messaging backbones, respective of at least one of the subtask nodes having a heterogeneous mixture of platform types and a heterogeneous mixture of messaging backbones.

19. One or more non-transitory computer-readable storage media storing a subtask node configuration table comprising a plurality of entries respectively comprising:
a subtask type indicative of a type of subtask of a business process task;
a name of a subtask node, wherein the name is indicative of a queue to which subtasks of the subtask type are to be directed; and
an instantiation limit indicative of a maximum number of instances of subtask processors to be instantiated in the subtask node for processing subtasks of the subtask type;
wherein the table comprises at least one subtask node name indicative of a queue managed in a plurality of execution environment types and a plurality of messaging backbone types.

20. One or more non-transitory computer-readable storage media storing computer-executable instructions causing a computer to perform a method, the method comprising:
receiving a request to process a business process task;
decomposing the business process task into at least one discrete subtask, wherein the at least one discrete subtask is associated with one out of a plurality of subtask types and the at least one discrete subtask is represented by a message;
based at least on the subtask type, routing the message to a subtask node dedicated to processing subtasks of the subtask type associated with the at least one discrete subtask;
wherein the subtask node is one of a plurality of subtask nodes dedicated to processing subtasks of respective subtask types, and the subtask node is separately throttleable by limiting a number of simultaneously instantiated instances to a particular number to control resources applied by the subtask node for processing subtasks of the subtask type;
wherein the limiting the number of simultaneously instantiated instances to a particular number is achieved by determining whether a number of instances has reached a configurable threshold;
wherein the plurality of subtask nodes comprise a heterogeneous mixture of platform types, a heterogeneous mixture of execution environments, a heterogeneous mixture of messaging backbones, and a heterogeneous mixture of operating systems;
wherein the subtask node comprises a heterogeneous mixture of platform types, a heterogeneous mixture of execution environments, a heterogeneous mixture of messaging backbones, and a heterogeneous mixture of operating systems; and
wherein the plurality of subtask nodes further comprises a wrapper to facilitate translation of messages between heterogeneous messaging backbones.

* * * * *

UNITED STATES PATENT AND TRADEMARK OFFICE
CERTIFICATE OF CORRECTION

PATENT NO. : 8,990,812 B2
APPLICATION NO. : 12/193640
DATED : March 24, 2015
INVENTOR(S) : Krishnaraj et al.

It is certified that error appears in the above-identified patent and that said Letters Patent is hereby corrected as shown below:

In the Claims:

Column 24, line 65, "processes" should read --process--

Signed and Sealed this
Seventeenth Day of May, 2016

Michelle K. Lee
*Director of the United States Patent and Trademark Office*